(12) United States Patent  (10) Patent No.: US 8,954,265 B2
Hagan  (45) Date of Patent: Feb. 10, 2015

(54) METHOD OF RESOLVING A LOCATION FROM DATA REPRESENTATIVE THEREOF

(75) Inventor: James Edward Hagan, Grantham, NH (US)

(73) Assignee: TomTom North America, Inc., Lebanon, NH (US)

( * ) Notice: Subject to any disclaimer, the term of this patent is extended or adjusted under 35 U.S.C. 154(b) by 0 days.

(21) Appl. No.: 13/640,088

(22) PCT Filed: Apr. 7, 2011

(86) PCT No.: PCT/US2011/031488
§ 371 (c)(1),
(2), (4) Date: Oct. 9, 2012

(87) PCT Pub. No.: WO2011/127226
PCT Pub. Date: Oct. 13, 2011

(65) Prior Publication Data
US 2013/0030692 A1   Jan. 31, 2013

Related U.S. Application Data

(60) Provisional application No. 61/342,068, filed on Apr. 9, 2010.

(51) Int. Cl.
*G01C 21/30* (2006.01)
*G01C 21/32* (2006.01)
(Continued)

(52) U.S. Cl.
CPC ............... *G01C 21/32* (2013.01); *G01C 21/30* (2013.01); *G06F 17/30241* (2013.01); *G09B 29/106* (2013.01)
USPC ........... 701/410; 701/446; 701/454; 701/520; 701/445; 701/493; 340/995.22; 340/995.12; 340/995.13; 340/995.19

(58) Field of Classification Search
None
See application file for complete search history.

(56) References Cited

U.S. PATENT DOCUMENTS 5,848,374 A * 12/1998 Wakabayashi et al. ........ 701/455
6,092,022 A *  7/2000 McBride ....................... 701/520
(Continued)

FOREIGN PATENT DOCUMENTS

EP   1273883 B1   8/2004
EP   1637841 A2   3/2006
(Continued)

OTHER PUBLICATIONS

International Search Report issued Jul. 13, 2011 for International Application No. PCT/US2011/031488.
(Continued)

*Primary Examiner* — Redhwan k Mawari
*Assistant Examiner* — Edward Torchinsky

(57) ABSTRACT

The invention provides a method of resolving a location in a second digital map from an ordered list of location reference points determined from a first digital map. The method involves identifying candidate lines and nodes in the second digital map, and using curvature, height and gradient information associated with the location reference points to identify the most likely candidate nodes or lines in the second digital map corresponding to the nodes represented by the location reference points and to lines emanating from or incident at the node in the first digital map. The method involves carrying out a route search between the most likely identified candidate node or line identified for one location reference point, and the corresponding node or line associated with the next reference point in the list, and repeating this step for consecutive pairs of reference points until the final location reference point is reached.

19 Claims, 16 Drawing Sheets

(51) Int. Cl.
*G06F 17/30* (2006.01)
*G09B 29/10* (2006.01)

(56) References Cited

U.S. PATENT DOCUMENTS

| | | | |
|---|---|---|---|
| 6,405,128 B1 * | 6/2002 | Bechtolsheim et al. | 701/431 |
| 6,415,226 B1 | 7/2002 | Kozak | |
| 6,662,101 B2 | 12/2003 | Adachi | |
| 6,687,611 B1 * | 2/2004 | Hessing et al. | 701/446 |
| 6,850,842 B2 * | 2/2005 | Park | 701/533 |
| 7,089,110 B2 | 8/2006 | Pechatnikov et al. | |
| 7,349,799 B2 * | 3/2008 | Joe et al. | 701/117 |
| 7,353,108 B2 * | 4/2008 | Adachi | 701/410 |
| 8,185,306 B2 * | 5/2012 | Adachi | 701/451 |
| 8,351,704 B2 * | 1/2013 | Kmiecik et al. | 382/190 |
| 2003/0004636 A1 | 1/2003 | Adachi | |
| 2003/0083813 A1 | 5/2003 | Park | |
| 2003/0223373 A1 | 12/2003 | Nakamura et al. | |
| 2003/0229441 A1 | 12/2003 | Pechatnikov et al. | |
| 2004/0039520 A1 | 2/2004 | Khavakh et al. | |
| 2004/0039524 A1 * | 2/2004 | Adachi | 701/209 |
| 2005/0033511 A1 | 2/2005 | Pechatnikov et al. | |
| 2005/0187708 A1 * | 8/2005 | Joe et al. | 701/210 |
| 2006/0122846 A1 | 6/2006 | Burr et al. | |
| 2006/0247852 A1 | 11/2006 | Kortge et al. | |
| 2008/0198043 A1 | 8/2008 | Adachi | |
| 2008/0201072 A1 | 8/2008 | Adachi | |
| 2008/0208469 A1 | 8/2008 | Obradovich et al. | |

FOREIGN PATENT DOCUMENTS

| | | |
|---|---|---|
| EP | 2161541 A1 | 3/2010 |
| GB | 2443472 A | 5/2008 |
| JP | 11258981 A | 9/1999 |
| JP | 2001021377 A | 1/2001 |
| JP | 2002228468 A | 8/2002 |
| JP | 2003016570 A | 1/2003 |
| JP | 2003288007 A | 10/2003 |
| JP | 2005345527 A | 12/2005 |
| RU | 2272255 C1 | 3/2006 |

OTHER PUBLICATIONS

International Search Report issued Sep. 10, 2009 for International Application No. PCT/EP2009/058130.

International Search Report issued Sep. 10, 2009 for International Application No. PCT/EP2009/058131.

OpenLR™ White Paper Version: 1.0 An open standard for encoding, transmitting and decoding location references in digital maps Sep. 2009.

OpenLR™ White Paper Version: 1.1 An open standard for encoding, transmitting and decoding location references in digital maps Dec. 11, 2009.

OpenLR™ White Paper Version: 1.2 An open standard for encoding, transmitting and decoding location references in digital maps Feb. 1, 2010.

* cited by examiner

Connection of LRPs

Logical format: Bearing point

Logical format: Bearing

Logical format: Distance to next point

Logical format: Positive and negative offset

Relationship: Attributes - LRP

Avoid nodes (1)

Avoid nodes (2)

Physical format: Bearing sectors

US 8,954,265 B2

METHOD OF RESOLVING A LOCATION FROM DATA REPRESENTATIVE THEREOF

CROSS-REFERENCES TO RELATED APPLICATIONS

This application is the National Stage of International Application No. PCT/US2011/031488, filed Apr. 7, 2011 and designating the United States. The application claims the benefit of U.S. Provisional Application No. 61/342,068 filed Apr. 9, 2010. The entire contents of both these applications are incorporated herein by reference.

FIELD OF THE INVENTION

The present invention is concerned with an improved method of resolving a location represented by data encoded according to one or more predetermined formats, and more specifically is concerned with an improved method for accurately determining a location within a digital map, such as those created and sold by Tele Atlas B.V. and Navteq Inc., in a manner which is not dependent on the particular digital map used during a decoding process and yet is identical to the originally encoded location.

Although the term "location" in the context of digital mapping can mean any of a variety of different physical, real-world features (e.g. a point location on the surface of the earth, a continuous path or route, or a contiguous chain of such, of navigable thoroughfares existing on earth, or an area or region on earth capable, in the case of a rectangular, square or circular area, of being defined by two or more parameters), this invention is most applicable to an encoded data representation of a path through a network of roads or other navigable thoroughfares represented in a digital map.

BACKGROUND TO THE INVENTION

Any modern digital map (or mathematical graph, as they are sometimes known) of a road network, in its simplest form, is effectively a database consisting of a plurality of tables defining firstly nodes (which can be considered as points or zero-dimensional objects) most commonly representative of road intersections, and secondly lines between those nodes representing the roads between those intersections. In more detailed digital maps, lines may be divided into segments defined by a start node and end node, which may be the same in the case of a segment of zero length, but are more commonly separate. Nodes may be considered real or "valid" for the purposes of this application when they represent a road intersection at which a minimum of 3 lines or segments intersect, whereas "artificial" or "avoidable" nodes are those which are provided as anchors for segments not being defined at one or both ends by a real node. These artificial nodes are useful in digital maps to provide, among other things, shape information for a particular stretch of road or a means of identifying the position along a road at which some characteristic of that road changes, e.g. a speed limit.

In practically all modern digital maps, nodes and segments (and/or lines) are further defined by various properties or attributes which are again represented by data in the tables of the database. Each node will typically have latitude and longitude coordinates to define its real-world position. The complete "graph" of the road network is described by millions of nodes and segments to cover an area of spanning one or more countries, or part thereof.

In the context of devising a means of efficiently referencing or describing a location (i.e. a path through a road network), it is not only highly inefficient simply to provide an ordered list of all nodes (and/or segments, and optionally their attributes) within the digital map which form part of the location, but such a referencing method would necessitate that exactly the same digital map was used during any de-referencing which later occurred, for example in a mobile device to which the location reference was transmitted, because nodes, segments, lines and their attributes are practically only ever uniquely defined in a particular version of a map created by a particular map vendor. Even fundamental attributes such as longitude and latitude for a particular node might differ between different digital maps.

One particular attribute often provided in digital maps is a Traffic Message Channel (TMC) location table reference. TMC is a technology for delivering traffic and travel information to vehicle users, and more particularly to navigation systems (either portable or integrated) present within those vehicles and which include some form of digital map. A TMC message consists of an event code (which need not be traffic-specific, although these are most common) and a location code, often consisting of an ordered list of location references by means of which the location of the traffic event can be determined in the digital map and thus represented graphically on the screen of the navigation system. A number of pre-defined nodes in most commercially available digital maps are assigned a TMC location reference which is determined with reference to a limited location table. The location table consists of $2^{16}$ (65536) location references corresponding to a similar number of physical or real world locations, usually road intersections, also identifiable in the digital map.

Although TMC messages are very efficient in that they can be as short as 37 bits in length and therefore do not impinge significantly on available bandwidth for broadcast data, only a fixed number of location references are available, and therefore typically only motorways and major highways (or intersections thereon) in each country offering TMC can be referenced. There are various other disadvantages of TMC location references. For instance, TMC location tables are
 often maintained through a public authority or National Government,
 prone to change between update cycles, which are traditionally quite long,
 non-existent, or available only commercially, in some markets.

Of course, decoding a TMC location reference is intrinsically simple in that a simple queries can be performed in the digital map database for each TMC location code resulting in immediate identification of the relevant correct nodes and segments (each map provider will include TMC location codes as part of the map production process ensuring precision), and thus the location can be immediately resolved. However, as it is becoming possible to identify traffic build up on secondary and urban roads using GSM and GPS probe data (e.g. vehicles users increasingly possess either a mobile phone or a connected satellite navigation devices useful as probes), TMC location codes are simply inadequate as far resolution is concerned.

One attempt to overcome some of the limitations of TMC location references or map-specific references is the Dynamic Location Referencing project, also known as AGORA-C (in the process of standardization under no. ISO 17572-1, 2, and 3). Although a complete description of the AGORA-C location referencing approach is beyond the scope of this application, the fundamentals of the approach are that a location reference can be completely specified by a set of location points, specified by coordinate pairs of latitude and longitude and ordered in a list, each point complying with various rules but most importantly being consecutive in terms of the location being referenced and the previous point in the list, i.e. successive points form a next-point-relationship. As with other location referencing systems, each point is provided with a number of attributes which assist in better defining that point, but specific to the AGORA-C method is the identification of each point as one of a location point, an intersection point, a routing point, or some combination of these three. Each point along the location at which the road section signature changes is represented by an intersection point, so locations being paths over a road network and which pass through intersections without any road section signature change need not be referenced by an intersection point. For example, if a location includes a section of motorway which includes junctions that are not relevant as far as the location is concerned, then there is no need to include intersection points for such junctions. One of the earlier steps in the AGORA-C encoding method is the determination of all intervening intersection points between a first and a last intersection point along the location at which a change of road section signature occurs.

All these points are added to a table of points ultimately forming part of the AGORA-C location reference. Within this table, at least two routing points will also have been identified, again according to certain rules. Routing points are provided where an intersection points alone are insufficient to unambiguously determine the correct location in the decoder, and are either added as separate points, or where a required routing point coincides with existing intersection point, a simple attribute change on the latter is effected.

Although this referencing approach is comprehensive in that it is possible to accurately and repeatably encode and decode any location existing within a geographical information system, it is believed that that the system is excessive and possibly redundant in certain aspects, and a more efficient encoding and decoding system is possible. For instance, although the referencing method is independent of any pre-compilation work and is map-independent, the average AGORA-C message size is significantly higher than 30 bytes per location reference. In terms of the devices which might commonly decode location references, such as personal navigation devices, PDAs, mobiles, or in-car integrated navigation systems, it is desirable that the received message be as short as possible to enable rapid decoding and ultimate resolution of the location represented thereby.

In the Applicant's application WO 2010/000707 A1 filed on 29 Jun. 2009 entitled "An Efficient Location Referencing Method", the contents of which are hereby incorporated by reference, a technique is described for producing a machine-readable representation of a location in a manner which not only is considered optimised as far as overall byte length is concerned, but which is also considered as being map-agnostic.

In another application filed by the Applicant on 29 Jun. 2009 entitled "A Method of Resolving a Location from Encoded Data Representative thereof", and published as WO 2010/000706 A1, a method of resolving a location is described. The contents of WO '706 is hereby incorporated by reference. The location is represented by structured data, typically a packet of binary data resulting from the encoding of an ordered list of location reference points representative of that location according to a physical data format specification using techniques described in WO '707. The method described is advantageous in being both economical in terms of required processing, and also achieving high success rates in terms of re-creating the correct location despite the relative brevity of received data regardless of the digital map used. In this regard, the method can be considered as map-agnostic, but the manner in which the decoding occurs, as opposed to the resolving of decoded data into a location, will inevitably be dependent on the predetermined format chosen.

While the encoding and decoding techniques described in WO '707 and WO '706 may solve many of the problems described above with previously known techniques, and have been found to facilitate resolution of locations in a second digital map using data describing the locations which has been encoded from a first digital map, the Applicant has realised that there remains scope for further refinement and improvement of these methods in relation to identifying the location in the second digital map when more than one possibility exists for a node and/or line or segment forming part of the location in the second digital map.

In accordance with the techniques described in WO '706, an ordered list of location reference points is used to resolve a location. The ordered list of reference points are representative of nodes in a first digital map, and are associated with information or attributes representative of properties of at least one specific line or segment in the first digital map emanating from or incident at the node. In accordance with the methods of WO '706, at least one candidate node in a second digital map is identified for each location reference point. For example, this may be a node identified as being a reasonable match due to its position. In addition at least one candidate line or segment in the second digital map emanating from or incident at the candidate node is identified. A route search is carried out in the second digital map between candidate nodes or candidate lines or segments for successive location reference points and those lines or segments forming part of the route determined extracted. This is repeated for each pair of consecutive location reference points.

In some situations more than one candidate node and/or more than one candidate line or segment in the second digital map may be identified for a given location reference point. The Applicant has realised that there remains a need for an improved method of resolving the location in the second digital map from the ordered list of location reference points in such situations.

SUMMARY OF THE INVENTION

In accordance with the present invention there is provided a method of resolving a location from an ordered list of location reference points, each location reference point being representative of a node in a first digital map and each location reference point being associated with information relating to the properties of a specific line or segment in said first digital map emanating from or incident at the node, the method comprising the steps of:

(i) for each location reference point, identifying at least one candidate node existing in a second digital map, and identifying at least one candidate line or segment existing in said second digital map emanating from or incident at said candidate node;

(ii) performing a route search within said second digital map between: at least one of an identified candidate node and a corresponding identified candidate line or segment emanating therefrom or incident thereat; and at least one of an identified candidate node for the next location reference point appearing in the list and a corresponding identified candidate line or segment emanating therefrom or incident thereat, and extracting from said second digital map each line or segment forming part of the route so determined between said candidate nodes; and (iii) repeating step (ii) for each consecutive pair of location reference points up to and including the final location reference point appearing in the list, wherein, when more than one candidate node and/or more than one candidate line or segment in the second digital map is identified for a given location reference point, the method further comprises a step of identifying a most likely candidate node and/or a most likely candidate line or segment, and using the most likely candidate node and/or most likely candidate line or segment in the route search, wherein curvature and/or elevation information is associated with each location reference point, the curvature and/or elevation information relating to the location reference point and/or the specific line or segment emanating from or incident at the node in the first digital map represented by the location reference point, and wherein the method comprises using the elevation and/or curvature information in said step of identifying the most likely candidate node and/or most likely candidate line or segment when more than one candidate node and/or candidate line or segment is found in the second digital map.

Accordingly, in embodiments of the invention, when more than one candidate node and/or more than one candidate line or segment emanating from or incident at a given candidate node is identified in the second map for a given location reference point, curvature and/or elevation information is used to select a most likely candidate node and/or candidate line or segment for use in the route calculation. In other words, curvature or elevation information is used in the step of determining which of the possible candidate nodes or lines or segments in the second map is the best match to the node, or line or segment associated with the node in the first digital map as represented by the location reference point.

A candidate node as defined herein is a node in the second digital map that is identified as being a possible match for the node in the first map represented by a location reference point. This may be determined on the basis of the position of the location reference point.

A candidate line or segment as defined herein is a line or segment that is identified as being a possible match in the second map for the specific line or segment in the first map emanating from or incident at the node represented by a location reference point. This may be determined using the information associated with the location reference point relating to the properties of the specific line or segment corresponding to the node represented by the first reference point in the first digital map.

The use of curvature or elevation information in accordance with the present invention has been found to enhance accuracy of matching a node or a line or segment in a first digital map to the corresponding node or line or segment in a second digital map, even where the maps are of different levels of completeness and positional accuracy. Furthermore, the technique has been found to allow locations to be accurately resolved between first and second maps even where the maps use different modelling specifications for node positioning. In effect, by associating curvature or elevation information relating to the nodes represented by the location reference points or the lines or segments emanating from or incident at the nodes with location reference points, additional geospatial dimensions are added to the ordered list of location reference points to provide greater accuracy and computational benefits when resolving the location from the first digital map in another digital map. This opens up the possibility of generating location reference points from a first digital map based upon raw or semi processed probe data for resolution in a second conventional e.g. topologically integrated navigational map.

Curvature or elevation information has been found to be particularly useful in disambiguating between otherwise similar nodes or lines/segments.

By way of example, it is possible that more than one node corresponding to a road intersection in a first digital map may be located in the same or similar position when only two dimensional e.g. longitudinal and latitudinal position information is considered. However, they may differ significantly in elevation. This could be the case in a stacked type intersection, where roads may come together one above the other. Thus, on the basis of geographical proximity to a location reference point representing one of the nodes in the first map and including longitudinal and latitudinal coordinate information only, multiple nodes in the second map may be identified as candidate nodes. By additionally associating elevation information with the location reference point, it is possible to distinguish between such candidate nodes, and determine which represents the best match to the location reference point and hence the node in the first digital map represented by the location reference point.

In another example, this time referring to candidate lines or segments, it may be found that more than one candidate line or segment emanates from or is incident at a candidate node in the second map. In cases where the angular separation between the lines or segments is slight, it may not be possible to determine which line or segment is the best fit to the line or segment associated with the node in the first map represented by the location reference point using the other attribute or property information associated with the location reference point in accordance with the previously proposed methods of WO 2010/000706 A1, e.g. class or form of road, bearing, road length. However, two otherwise similar lines or segments may have different curvature as they enter or leave the node, or may have different change of elevation i.e. gradient. Taking curvature or elevation information into account makes it possible to determine the line or segment in the second map with the best fit to the line or segment associated with the node represented by the location reference point in the first map.

The step of using the curvature and/or elevation information to identify a most likely candidate node and/or line or segment is applicable whenever multiple candidate nodes or lines/segments are identified. It is necessary to identify a single candidate node and a single corresponding candidate line or segment for use in the route search of step ii). Depending upon whether multiple candidate nodes or multiple candidate lines/segments or both are found, the step may be used to identify only a most likely candidate node, only a most likely candidate line or segment or both a most likely candidate node and a most likely candidate line or segment. The way in which the curvature and/or elevation information is used will depend upon how many candidate nodes or lines/segments are identified in the second map. The present invention extends to embodiments in which more than one candidate line or segment is identified for a given location reference point, and/or wherein more than one candidate node is identified for a given location reference point. The method will then involve using the curvature and/or elevation information to identify a most likely candidate node and/or line or segment for use in the route search.

In embodiments of the invention, when distinguishing between multiple candidate nodes, elevation information is preferably used. When distinguishing between multiple candidate lines or segments curvature and/or elevation information may be used. In accordance with some embodiments, elevation information and/or curvature information relating to the specific line or segment emanating from or incident at the node represented by the location reference point is associated with each location reference point, and, when more than one candidate line or segment is identified for a given location reference point, the method comprises identifying the most likely candidate line or segment for the location reference point using the curvature and/or elevation information. Alternatively or additionally, in some embodiments, elevation information relating to the node represented by the reference point is associated with each location reference point, and when more than one candidate node is identified for a given location reference point, the method comprises identifying the most likely candidate node for the location reference point using the elevation information.

The elevation information in accordance with any of the embodiments of the invention may be information regarding any form of elevation e.g. height. The elevation information may be absolute or relative elevation information. For example information relating to the elevation of a first location reference point of the ordered list may be absolute elevation information. Elevation information associated with successive location reference points may be relative elevation information e.g. relative to the elevation of the first or previous location reference point. The elevation information may alternatively be information regarding a change in elevation i.e. gradient. Elevation difference information is particularly applicable when the elevation information relates to a line or segment.

In embodiments the elevation information is one or more of absolute elevation information, relative elevation information or elevation change e.g. gradient information. In preferred embodiments, whether it relates to absolute or relative elevation, or a change in elevation, the elevation information is preferably ellipsoidal height information. In embodiments elevation information relating to a location reference point is or includes absolute or relative ellipsoidal height information and elevation information relating to a specific line or segment is or includes information relating to a change in elevation or absolute or relative elevation. It will be appreciated that elevation information relating to a line or segment may also be absolute or relative ellipsoidal height information for the line or segment or the node that the line or segment emanates from or is incident at. For example, when distinguishing between two candidate lines, the height of a node associated with the lines may be used to disambiguate the lines wherein the lines are associated with different nodes.

Elevation information may be associated with a location reference point as part of the position information describing the position of the location reference point i.e. the position of the node represented thereby. In preferred embodiments each location reference point is associated with position information defining the position of the location reference point. The position information may comprise a set of coordinates. Rather than associating a two dimensional set of coordinates describing the position of the reference point with the reference point, a three dimensional set of coordinates may be used in accordance with the invention to provide elevation information. Preferably therefore, each location reference point is associated with information defining the position of the location reference point, the position information including elevation information for the location reference point. Preferably the location reference point is associated with position information in three dimensions. In embodiments the location reference point is associated with a set of coordinates providing the position information. Preferably the set of coordinates includes longitudinal, latitudinal and elevation coordinates.

As described in WO 2010/000706 A1, the step of identifying at least one candidate node existing in the digital map will typically be done on the basis of proximity of nodes in the second map to the position of the location reference point. Accordingly, in embodiments, the step of identifying the at least one candidate node in the second map comprises using the position of the location reference point to identify the at least one candidate node. The method may comprise selecting nodes in the second map located within a given threshold distance of the location reference point as the candidate node or nodes. The position used to identify the at least one candidate node may be a two dimensional position. The threshold distance may be a two dimensional distance. In some embodiments the at least one candidate node is identified using only longitudinal and latitudinal position information.

In accordance with embodiments of the present invention, when multiple candidate nodes are identified, elevation information associated with the location reference point is used to identify the most likely candidate node. Thus the elevation information for the location reference point may be used to determine which of the candidate nodes has a position most closely matching that of the location reference point. In other words, the position of the location reference point in the third dimension may be used to identify the most likely candidate node among the candidate nodes. It will be seen therefore that the elevational information may be used to distinguish amongst multiple candidate nodes identified on the basis of two dimensional position.

It will be seen therefore that the elevation information for a reference point may be associated with the reference point as part of the position information for the reference point. In embodiments, each location reference point is associated with position information. The position information is indicative of the position of a node in the first map represented by the reference point. In accordance with the invention the position information preferably includes elevation information. In preferred embodiments the position information is in the form of a set of coordinates. The coordinates describe the position of the node in at least two dimensions, and preferably three dimensions. The coordinates may include longitudinal, latitudinal and preferably elevational coordinates for the node.

The skilled person will recognise that absolute or relative elevational information relating to a location reference point i.e. to the node represented thereby may be obtained in a number of ways. For example, the information may be obtained directly or indirectly from a first map for association with the location reference point when the ordered list of reference points is created. For example, elevation may already be a feature of the first digital map database, and the relevant elevational data may be copied from the map database and associated with the location reference point in the same way as other geographical coordinates. In other cases, the elevation information may be derived by reference to a linear reference resource of the first map database, such as a probe trace.

Another option might be to obtain the elevation information by reference to a digital terrain map (DTM) of the region containing the node.

In preferred embodiments, elevation information associated with a given reference point and relating to a corresponding line or segment emanating from or incident at the node represented by the reference point is or comprises gradient information. In other words the information relates to a slope of the line or segment.

In accordance with the invention, information relating to the properties of a specific line or segment emanating from or incident at the node in the first map represented by the location reference point is associated with the reference point. In embodiments each location reference point is associated with information relating to the properties of only one specific line or segment emanating therefrom or incident thereat. In practice whether or not information for an incoming or outgoing line or segment is provided will depend upon the position of the reference point in the ordered list. In some embodiments, for all except the last location reference point, information relating to the properties of an outgoing line or segment is associated with the reference point. For the last reference point information about an incoming line or segment is associated with the reference point.

This information provides the location reference points with attributes indicative of the properties of a specific outgoing or incoming line or segment. Thus the information may be referred to as an attribute or attributes of the location reference point. The information may be used to identify the one or more candidate lines or segments associated with a candidate node in the second map. In other words, rather than having to know detailed position information describing the path of a line or segment in the first map to try to identify a matching line or segment in the second map, the invention relies upon using the attributes or information associated with the reference point indicative of properties of the line or segment incident at or emanating from the node represented by the reference point in the first map to identify the candidate lines or segments in the second map i.e. the possible matching lines or segments. For example, the property may be a road type, such as road class. When identifying candidate lines or segments in the second map, the system may look for lines or segments associated with a candidate node that are of the same class as the specific line or segment in the first map. In other words, the properties of the line or segment in the first map are used as criteria when identifying candidate lines or segments in the second map.

This information associated with the reference point is indicative of properties of the specific line or segment other than position. These properties are often referred to as attributes of the lines or segments. Thus the information associated with the reference point may be referred to as information relating to attributes of the specific line or segment. The attributes or properties may be attributes/properties of the line or segment itself and/or indicative of attributes/properties of a road or road segment represented by the line or segment. Preferably the information includes information relating to properties of each specific line or segment other than curvature and/or elevation information.

It will be appreciated that information may be associated with a location reference point relating to a wide range of possible properties of the specific line or segment associated with the node represented by the location reference point in the first map. The information may relate to one or more of the following line or segment properties; length, speed limit, bearing, type of road, class of road, bearing and direction of travel. The properties may include whether a speed camera is present, a safety rating etc. The properties may be present in a digital map database, derived from probe data, or may be suggested by users of a navigation system or obtained in any other manner. However, ideally the properties are properties which may be associated with lines or segments in different maps, or which may be readily derived from information typically associated with lines or segments in maps to enable them to be matched across different maps, and should therefore preferably be commonly used properties, or ones which can be derived based on commonly used properties.

The information relating to the properties of the line or segment which is associated with a location reference point may be obtained directly from data of the first digital map or in any other manner. Thus the information may correspond to line or segment attributes or properties found in the first map database. In other embodiments the information may be derived using data from other databases referenced by the digital map, using a digital terrain map, or may be derived specifically for the purposes of the invention. One example of a specifically derived property might be a bearing of a line or segment.

In some embodiments a location reference point is additionally associated with information defining a relationship between the reference point and another e.g. successive or previous location reference point in the list. For example, information relating to the distance to the next reference point may be included. This may be used to verify the candidate nodes identified in the second map.

In accordance with the invention curvature and/or elevation information relating to the specific line or segment emanating from or incident at the node represented by the reference point may be associated with a location reference point. The curvature and/or elevation information may be associated with the reference point in a similar manner to the information relating to other properties of the line or segment. As mentioned above, the elevation information relating to a line or segment is preferably elevation difference e.g. gradient information, although it is envisaged that absolute or relative elevation information could be used to define the properties of lines or segments.

As mentioned above, in embodiments, the information associated with a location reference point relating to the properties of a specific line or segment in the first digital map emanating from or incident at the node may be used in the step of identifying the at least on candidate line or segment. In preferred embodiments, the information used to identify the at least one candidate line or segment is information other than information relating to the elevation and/or curvature of the specific line or segment. The information relating to the elevation and/or curvature of the specific line or segment is used in a further step of identifying a most likely candidate line or segment where multiple candidate lines or segments are identified. For example, in order to determine the candidate lines or segments, information relating to properties such as the direction of travel or class of the line or segment may be used. The curvature and/or elevation information may be used in a subsequent step to determine the most likely of the identified candidate lines or segments. In some arrangements it may not be necessary to use to the information relating to the properties of the specific line or segment to identify candidate lines or segments. For example, all lines or segments emanating from or incident to a given candidate node may be identified as candidates.

The step of identifying at least one candidate node or at least one candidate line or segment preferably comprises creating a list of candidate nodes and/or candidate lines or segments. In some preferred embodiments the step of determining the most likely candidate node and/or candidate line or segment is a separate step from the step of identifying the at least one candidate node and/or candidate line or segment. The step of identifying the most likely candidate node and/or line or segment is then a subsequent step to the step of identifying the at least one candidate node and/or line or segment.

It will be appreciated that when used, gradient information may be obtained in a similar manner to other types of elevation information as described above. This may be obtainable directly from the first digital map data, or from a linear referenced resource linked to the first map database. Alternatively the information may be derived using a digital terrain map. Any other suitable methods of obtaining gradient information may also be used.

The gradient information relates to the gradient properties of a specific line or segment in at least one direction of travel into or out of the node represented by the reference point. In preferred embodiments gradient information is provided for both inflow and outflow along the line or segment to or from the node.

The gradient information preferably includes the degree of gradient of the line or segment. The gradient information preferably includes at least one gradient value for the line or segment. In preferred embodiments a gradient value is provided for a segment or line in both directions of travel toward and away from the node. A gradient value may be an actual value based on or scaled from a gradient measurement or may be a factor indicative of a range in which the gradient falls etc. In some embodiments the gradient values defining bounds within which the gradient falls are used. The gradient value may be an average value.

When gradient information is associated with a reference point relating to the gradient of the specific line or segment emanating from or incident at the node represented by the reference point, it will be appreciated that the gradient information will typically have limited validity along the length of the line or segment away from the node. In preferred embodiments the gradient information includes a gradient value and a distance of validity of the gradient value along the line or segment from the node. The distance of validity might be in a range of meters or km, e.g. up to 200 m, etc. The distance of the validity is a distance along the line or segment over which the gradient value may be considered to reflect the gradient of the line or segment. A gradient value may be an average value over the validity distance.

The gradient information preferably includes a direction of the gradient. The gradient information preferably defines whether the line or segment defines a positive or negative gradient, i.e. an upward or downward gradient reflecting an increase or decrease in elevation. This may be conveyed by using a positive or negative gradient value. The gradient may be measured in a direction facing outward from the node.

The curvature information relates to the curvature properties of a line or segment in at least one of the directions into or out of the node represented by the reference point in the first map. In preferred embodiments curvature information is provided for both inflow and outflow along the line or segment to or from the node.

The curvature information for a line or segment preferably includes information relating to the degree of curvature. The curvature information relating to a line or segment may include at least one curvature value. A curvature value may be provided for directions of travel along the line or segment both into and out of the node.

The curvature value may be an actual curvature value or a factor indicating the range in which the curvature falls etc. A curvature value may be scaled e.g. to provide a value from 1-100. In some embodiments curvature values defining bounds within which the curvature falls are used. The gradient value may be an average value. Preferably the curvature value comprises radius of curvature information.

A validity distance for the curvature value may be provided. The validity distance may be the distance along the line or segment from the node over which the curvature value may be considered to reflect the curvature of the line or segment.

In some embodiments a line or segment curvature may be obtained by fitting a circle to the line or segment to approximate the curvature thereof at least at the node end of the line or segment. The radius of the circle may be used to derive an approximate radius of curvature value. In some embodiments the curvature value is derived using a reciprocal of the radius of the circle. A validity distance may correspond to a distance from the node to the point at which the circle touches the line or segment.

The curvature information preferably includes information relating to the direction of curvature. The curvature information preferably defines whether a curvature is a positive or negative curvature i.e. representing a left or right curve. The curvature is horizontal curvature. The curvature is defined in a direction facing outward from a node.

A curvature value may be obtained in any suitable manner, and may be obtained directly or indirectly from a first map database, or associated data. For example, a radius of curvature may be provided as part of the map data, or may be determined using the map data. Curvature information may be obtained in any of the manners described in relation to gradient information. For example, a linear reference resource may be associated with the map database which may be used to determine the curvature information. Alternatively or additionally a digital terrain map may be used.

It has been found that by including curvature or elevation information in the information associated with the reference points, the present invention affords considerable improvements in accuracy of identifying nodes, lines or segments in the second map without significantly increasing required data storage levels.

It will be appreciated that in order to make a comparison to the curvature or elevation e.g. gradient information associated with the reference point, it may be necessary to derive corresponding values for a candidate node or line or segment in the second digital map. Curvature or elevation information may be determined in a similar manner as described in relation to the first digital map. Elevation information in the form of absolute or relative elevation e.g. height may be determined using coordinate information in the second map data. Gradient information may, if not directly available, readily be derived using coordinates of nodes or lines/segments and portions thereof in the second digital map. Curvature may also be determined, if not directly available, using a simple calculation based on the second digital map. However, in other cases, curvature information or gradient information may be included in the second map database. Curvature or elevation information may be obtained using the second map data alone, or in conjunction with other data e.g. associated with the map data.

In accordance with the invention, the step of identifying the most likely candidate node and/or line or segment is carried out using the elevation and/or curvature information. It will be appreciated that identification of the most likely candidate node or most likely line or segment may not be carried out solely by reference to the curvature and/or elevation information. A range of different factors may be used to determine the degree of matching between a candidate node or line/segment and the node or line/segment in the first map as defined by the location reference point and its associated information. It has found, however, that such curvature or elevation information may be decisive when other information has failed to unambiguously identify a node or line/segment, and thus provides particular advantages whether used alone or in combination with other factors. In some embodiments the curvature and/or elevation information may be used as the determining factor when identifying the most likely node or line/segment. When two dimensional position information fails to unambiguously identify a candidate node in the second map, the elevation information may provide the determining information. Similarly when determining a line/segment, the curvature or gradient may distinguish between two otherwise similar lines or segments e.g. where angular separation is small, and the lines/segments are of the same type.

The curvature and/or elevation information may be used alone to determine the most likely node and/or line or segment, or more preferably is used with other factors to determine the most likely node and/or line or segment. The information may be used in a rating process together with other factors.

In some embodiments the method comprises rating the identified candidate nodes or candidate lines or segments according to the likelihood that they correspond to the node in the first map or the line or segment corresponding to the node in the first map represented by the location reference point. The step of identifying the most likely candidate node and/or line or segment may be carried out using the results of the rating step. Where rating is carried out, it will take into account the curvature and/or elevation information for the respective candidate node or line/segment. Thus, in embodiments the identified candidate nodes or candidate lines or segments are rated using predetermined factors including or consisting of curvature and/or elevation. In embodiments other information from the information relating to the properties of the line or segment which is associated with the location reference point is used with the curvature and/or elevation information. In some embodiments other factors used in the rating step may include the class of road represented by the line or segment, the form of road represented by the line or segment etc. In preferred embodiments rating of the candidate nodes and/or lines is carried out using a rating function. A rating function may combine the results of rating the candidates in relation to different factors into a single rating value for the line or node.

Use of a rating process enables a range of different properties of a line/segment or node to be weighed up to determine the most likely candidate on the basis of predetermined criteria. The same rating function or process may be used to rate candidate nodes or lines/segments or different functions may be used. A rating function may be determined as desired.

Rating may provide an ordered list of candidate nodes or candidate lines or segments i.e. in order of likelihood that they correspond to a node or line or segment in the first map. A rating value may be assigned to the or each candidate node or line or segment indicative of the relative likelihood of the candidate. In some embodiments where multiple candidate nodes or lines or segments are identified the candidate nodes or lines/segments are ranked according to the likelihood that they correspond to the node or line or segment in the first map.

It will be appreciated that in some situations, if after the route calculation has been performed, the resulting path is considered to be incorrect for some reason, or doubtful, the calculation may be repeated with different pairs of nodes and lines/segments. Thus one or more of the less likely candidate nodes or lines/segments may be used in a repeat of the calculation. It may therefore be important to rate all candidate nodes or lines/segments to facilitate any recalculation. This may also identify which candidate nodes are most doubtful.

In some embodiments identification of the most likely candidate node and/or rating of candidate nodes or the rating of likely candidate nodes and/or candidate lines or segments is carried out by reference to factors including elevation and the distance between the location reference point and the candidate node in the second map. The distance may be an absolute or calculated distance. The distance is based on latitudinal and/or longitudinal coordinate information. The location of the node in the second map may be extracted in the form of its coordinates to facilitate comparison to coordinates defining the position of the location reference point.

Identification of the most likely candidate line or segment or rating of candidate lines or segments may be carried out by reference to curvature or elevation e.g. gradient criteria and preferably also other properties or attributes of the lines or segments. This may be achieved using the information relating to the other properties of the lines or segments associated with the location reference point. This may enable similarity of the attributes or properties of the lines or segments to be taken into account.

The route search used in accordance with the invention in any of its embodiments may be of any type. Preferably, the route search is a shortest path route search, or includes an element which is fundamentally related to the distance between the start and end point used as inputs to the route search. Different types of route searches may therefore be considered, such as Dijkstra's algorithm or A*.

Preferably, the route search operates on respective pairs of successive candidate nodes, and is conducted such that the corresponding line or segment of the first of the pair of nodes forms part of the route resulting therefrom. This may be carried out by suitably limiting the search to require that the route includes the line or segment. It will be appreciated that the route search is carried out using the most likely candidate nodes and most likely lines or segments corresponding to the nodes where multiple candidate nodes or lines or segments were initially identified. Thus, prior to carrying out the route search, the curvature and/or elevation information associated with a reference point is used to identify the most likely candidate node and most likely corresponding candidate line or segment to be used.

Preferably the candidate nodes identified are real nodes in that they are representative of real world intersections. The system may be arranged to only identify candidate nodes which are real nodes. Real nodes are more likely to be present on different digital maps. If the reference point is arranged to be representative of a real node in a first map, the matching node in the second map should be a real node rather than an artificial node that might be nearby. Artificial nodes are more likely to be specific to a given map.

Preferably, the method further comprises the step of storing the extracted lines or segments obtained from each of the successive route searches for consecutive pairs of location reference points in a location path list. The location path list may be obtained by storing separate location path lists obtained using the lines or segments extracted in each route search in a single list, or by storing the lines or segments in separate lists and concatenating the lists as a final step. The ultimate effect will be the same, that is to provide a means of completely identifying the location.

Further preferably, the method includes a final step of applying any offset value which may be associated with the first and last location reference points to the first and last lines in the resulting list of lines or segments present in the second digital map. The offset value as discussed below is a distance along the line between the start or end of the location reference path and the real start or end of the location in the first digital map.

In some embodiments the method in accordance with any of the embodiments of the invention includes the further steps of:

determining, from the second map, a path length value for each path between successive candidate nodes within said second digital map, said path being established as a result of the route search between said successive candidate nodes, comparing the path length value so determined with a distance to next reference point (DNP) property associated with the first of the two location reference points used in the route search, and in the event of that a difference between the path length value and the DNP property exceeds a predetermined threshold, either repeating the route search using alternative candidate nodes and/or lines for one or both of each successive pair of location reference points to attempt to reduce the difference between path length value and DNP attribute, or reporting an error.

In a preferred embodiment, the method further comprises displaying the second digital map on a display, and displaying the resolved location or a portion of it on the digital map. The resolved location may be displayed superposed, overlaid, juxtaposed or in conjunction with the relevant portion of the digital map.

The present invention is directed to a method of resolving a location. The location is a location in a first digital map which has been referenced to provide the ordered list of location reference points which may be used to resolve the location in a second digital map. The referencing of the location in a first digital map to provide the ordered list of location reference points enables the location to resolved i.e. be matched to a corresponding location in a second digital map using the ordered list of location reference points.

The step of resolving the location in the second map may be referred to as decoding the location from the ordered list. The term "decoding" herein refers to the resolution of the location in the second digital map from the ordered list of location reference points i.e. the identification of the location in the second digital map using the ordered list of location reference points.

The term "encoding" refers to the referencing of the location in the first digital map to provide the ordered list of location reference points for use in resolving the location in the second digital map. Thus the step of referencing the location may be referred to as encoding the location. The location is encoded in that the location from the first digital map is converted to a different form which may be "decoded" or interpreted for determining the location in the second map.

In accordance with the invention the location is resolved from encoded location information comprising or consisting of the ordered list of location reference points. The encoded location information may consist of the ordered list of location reference points or may additionally comprise other encoded location information. The encoded location information or ordered list of location reference points is machine readable data.

The first digital map may be referred to as the encoder digital map. The second digital map may be referred to as a decoder digital map.

The term digital map herein may refer to any form of map. It will be appreciated that a digital map need not be a conventional topologically integrated navigation map. In particular, it has been found that the present invention provides methods which allow a location in a wide range of types of first digital map to be resolved in a second digital map. A first digital "map" need not be a complete map provided that it provides some form of structure indicating nodes and lines/segments emanating therefrom or incident thereto which may form the basis of locations to be resolved in another map. For example, it may comprise a raw or semi processed probe data or any form of map-like data set. Probe traces may provide indications of map features such as roads, nodes etc, which may be encoded in the ordered list of reference points. Preferably the first digital map is at least partially in the form of probe data.

The method enables a location e.g. path determined from such a "map" to be resolved on a conventional map e.g. to identify a region of high traffic levels to be displayed to a user of a navigation device. For example, the first digital map may comprise probe traces representative of the position of vehicles in a given region. The map may only include probe traces for particular road segments and/or intersections of interest e.g. motorways. The probe traces may be used to determine traffic levels. By matching the nodes or lines/segments corresponding to paths of probe traces indicative of roads/intersections to locations in a full digital map, regions to be associated with traffic information may be identified.

In accordance with the invention, the method may be carried out by any form of apparatus. The method steps may be implemented by one or more processors of the apparatus.

In a further aspect of the invention there is provided an apparatus, optionally handheld, arranged to carry out any of the methods herein described. The apparatus may comprise a set of one or more processors for carrying out the steps of the method. The apparatus may be any form of computing apparatus. The apparatus may be referred to as a decoder apparatus. In some embodiments the method is carried out by a decoder apparatus of a mobile communications apparatus, and the apparatus is a decoder apparatus of a mobile communications apparatus. The mobile communications apparatus may be a mobile telephone, personal digital assistant, or navigation apparatus. The navigation apparatus may be an in-vehicle navigation apparatus. The navigation apparatus may be a portable navigation device or an integrated navigation system such as an in-vehicle integrated navigation system. The navigation apparatus may be provided by means of an application of a processing device which does not form part of a specific navigation device. For example the invention may be implemented using a suitable computer system arranged to execute navigation software. The system may be a mobile or portable computer system e.g. a mobile telephone or laptop, or may be a desktop system. The decoder apparatus may be or comprise a set of one or more processors for carrying out the steps described.

Accordingly, the apparatus may be a personal navigation device (PND), a personal digital assistant (PDA) or mobile telephone.

The apparatus preferably comprises means for displaying a digital map, and may comprise a memory storing the second digital map. The apparatus comprises means for causing the resolved location, or a part thereof, to be displayed on the display means.

Regardless of its implementation, a navigation apparatus in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In accordance with a further aspect the present invention extends to a decoder apparatus for resolving a location from an ordered list of location reference points in accordance with the method of any of the aspects and embodiments of the invention.

In accordance with a further aspect of the invention there is therefore provided a decoder apparatus comprising means for resolving a location from an ordered list of location reference points, each location reference point being representative of a node in a first digital map and each location reference point being associated with information relating to the properties of a specific line or segment in said first digital map emanating from or incident at the node, the decoder apparatus comprising means for carrying out a method comprising the steps of:

(i) for each location reference point, identifying at least one candidate node existing in a second digital map, and identifying at least one candidate line or segment existing in said second digital map emanating from or incident at said candidate node;

(ii) performing a route search within said second digital map between: at least one of an identified candidate node and a corresponding identified candidate line or segment emanating therefrom or incident thereat, and at least one of an identified candidate node for the next location reference point appearing in the list and a corresponding identified candidate line or segment emanating therefrom or incident thereat, and extracting from said second digital map each line or segment forming part of the route so determined between said candidate nodes; and (iii) repeating step (ii) for each consecutive pair of location reference points up to and including the final location reference point appearing in the list, wherein, when more than one candidate node and/or more than one candidate line or segment in the second digital map is identified for a given location reference point, the method further comprises a step of identifying a most likely candidate node and/or a most likely candidate line or segment, and using the most likely candidate node and/or most likely candidate line or segment in the route search, wherein curvature and/or elevation information is associated with each location reference point, the curvature and/or elevation information relating to the location reference point and/or the specific line or segment emanating from or incident at the node represented by the location reference point in the first digital map, and wherein the method comprises using the elevation and/or curvature information in said step of identifying the most likely candidate node and/or most likely candidate line or segment when more than one candidate node and/or candidate line or segment is found in the second digital map.

The present invention in this further aspect may include any or all of the features described in relation to the other aspects of the invention. Thus the decoder apparatus may comprise means for carrying out any of the method steps described. It will be appreciated that the decoder apparatus may include a set of one or more processors for carrying out any of the steps defined or in accordance with the methods of the invention in any of their aspects or embodiments.

The process of encoding a location in a first digital map to provide the ordered list of location reference points which may be decoded to resolve the location in a second digital map provides a way of communicating a location from the first digital map to the second digital map.

The ordered list of location reference points may be transmitted by a transmitter of an encoder apparatus and received by a receiver of a decoder apparatus for use in the method of the present invention in any of its embodiments. In some embodiments the method comprises receiving the ordered list of location reference points, and the decoder apparatus may comprise a receiver for carrying out this step. The ordered list of location reference points may be transmitted with other location specific information such as traffic information or weather information. In some embodiments the method comprises receiving location specific information such as traffic or weather information in association with the ordered list of location reference points.

In some embodiments the second digital map may be a digital map of a receiving apparatus and the first digital map may be a digital map of a transmitting apparatus. The transmitting apparatus encodes a location on the first digital map to provide the ordered list of location reference points and transmits the ordered list of location reference points to a receiver for decoding to determine the corresponding location on the second digital map.

The present invention extends to a method and system involving the encoding and transmission of the ordered list of location reference points.

In accordance with a further aspect of the invention there is provided a method of communicating location information, the method comprising:

an encoder apparatus encoding a location represented in a first digital map, the location being expressible as a list of nodes and lines and/or segments emanating from or incident at the nodes, wherein the step of encoding the location comprises providing an ordered list of location reference points being representative of nodes in the first digital map and each being associated with information representative of properties of a specific line or segment in the encoder digital map emanating from or incident at the nodes, wherein the method includes the step of associating curvature and/or elevation information with each location reference point, the curvature and/or elevation information relating to the location reference point and/or the specific line or segment emanating from or incident at the node in the first digital map represented by the location reference point;

the method further comprising the encoder apparatus transmitting the ordered list of location reference points and the associated information to a decoder apparatus. Preferably the decoder apparatus is arranged to resolve the encoded location from the received ordered list of location reference points by a method comprising the steps of any of the aspects or embodiments of the invention.

In accordance with a further aspect of the present invention there is provided an encoder apparatus for encoding a location represented in a first digital map, the location being expressible as a list of nodes and lines and/or segments emanating from or incident at the nodes, wherein the encoder apparatus is arranged to carry out a step of encoding the location to provide an ordered list of location reference points being representative of nodes in the first digital map and each being associated with information representative of properties of a specific line or segment in the encoder digital map emanating from or incident at the nodes, wherein curvature and/or elevation information is associated with each location reference point, the curvature and/or elevation information relating to the location reference point and/or the specific line or segment emanating from or incident at the node in the first digital map represented by the location reference point;

the encoder apparatus further comprising means for transmitting the ordered list of location reference points and the associated information to a decoder apparatus. The decoder apparatus may comprise means for resolving the encoded location from the received ordered list of location reference points by a method comprising the steps of any of the aspects or embodiments of the invention.

In accordance with a further aspect of the invention there is provided a method of communicating location information, the method comprising:

an encoder apparatus encoding a location represented in a first digital map, the location being expressible as a list of nodes and lines and/or segments emanating from or incident at the nodes, wherein the step of encoding the location comprises providing an ordered list of location reference points being representative of nodes in the first digital map and each being associated with information representative of properties of a specific line or segment in the encoder digital map emanating from or incident at the nodes, the method including the step of associating curvature and/or elevation information with each location reference point, the curvature and/or elevation information relating to the location reference point and/or the specific line or segment emanating from or incident at the node in the first digital map represented by the location reference point, the method further comprising the encoder apparatus transmitting the ordered list of location reference points and the associated information to a decoder apparatus;

the method comprising the decoder apparatus carrying out a method comprising the steps of:

receiving the transmitted ordered list of reference points and associated information; and (i) for each location reference point, identifying at least one candidate node existing in a second digital map, and identifying at least one candidate line or segment existing in said second digital map emanating from or incident at said candidate node;

(ii) performing a route search within said second digital map between: at least one of an identified candidate node and a corresponding identified candidate line or segment emanating therefrom or incident thereat, and at least one of an identified candidate node for the next location reference point appearing in the list and a corresponding identified candidate line or segment emanating therefrom or incident thereat, and extracting from said second digital map each line or segment forming part of the route so determined between said candidate nodes; and (iii) repeating step (ii) for each consecutive pair of location reference points up to and including the final location reference point appearing in the list, wherein, when more than one candidate node and/or more than one candidate line or segment in the second digital map is identified for a given location reference point, the method further comprises a step of identifying a most likely candidate node and/or a most likely candidate line or segment, and using the most likely candidate node and/or most likely candidate line or segment in the route search, wherein the method comprises using the elevation and/or curvature information in said step of identifying the most likely candidate node and/or most likely candidate line or segment when more than one candidate node and/or candidate line or segment is found in the second digital map.

In accordance with a further aspect of the invention there is provided a system of communicating location information, the system comprising:

an encoder apparatus comprising means for encoding a location represented in a first digital map, the location being expressible as a list of nodes and lines and/or segments emanating from or incident at the nodes, wherein the encoder apparatus is arranged to encode the location to provide an ordered list of location reference points being representative of nodes in the first digital map and each being associated with information representative of properties of a specific line or segment in the encoder digital map emanating from or incident at the nodes, the encoder apparatus associating curvature and/or elevation information with each location reference point, the curvature and/or elevation information relating to the location reference point and/or the specific line or segment emanating from or incident at the node represented by the location reference point;

wherein the system further comprises a decoder apparatus, the encoder apparatus comprising means for transmitting the ordered list of location reference points and the associated information to the decoder apparatus, and wherein the decoder apparatus is arranged to carry out a method comprising the steps of:

receiving the transmitted ordered list of reference points and associated information; and (i) for each location reference point, identifying at least one candidate node existing in a second digital map, and using said information associated with the location reference point, identifying at least one candidate line or segment existing in said second digital map emanating from or incident at said candidate node;

(ii) performing a route search within said second digital map between:

at least one of an identified candidate node and a corresponding identified candidate line or segment emanating therefrom or incident thereat, and at least one of an identified candidate node for the next location reference point appearing in the list and a corresponding identified candidate line or segment emanating therefrom or incident thereat, and extracting from said second digital map each line or segment forming part of the route so determined between said candidate nodes; and (iii) repeating step (ii) for each consecutive pair of location reference points up to and including the final location reference point appearing in the list, wherein, when more than one candidate node and/or more than one candidate line or segment in the second digital map is identified for a given location reference point, the method further comprises a step of identifying a most likely candidate node and/or a most likely candidate line or segment, and using the most likely candidate node and/or most likely candidate line or segment in the route search, wherein the method comprises using the elevation and/or curvature information in said step of identifying the most likely candidate node and/or most likely candidate line or segment when more than one candidate node and/or candidate line or segment is found in the second digital map.

The present invention in these further aspects may include any or all of the features described in relation to the other aspects of the invention. Thus the decoder apparatus may comprise means for carrying out any of the method steps described. It will be appreciated that the decoder and/or the encoder apparatus may include a set of one or more processors for carrying out any of the steps of the methods defined.

The present invention extends to a computer program product comprising computer readable instructions executable to perform a method according to any of the aspects or embodiments of the invention, or to cause an apparatus to perform such methods.

In a yet further aspect, there is provided such a computer program embodied on a computer readable medium.

The techniques of the present invention in any of its aspects may be applied to any context where it is desirable to be able to match a location in one digital map to a location in another digital map.

The present invention is particularly advantageous in methods in which it is necessary to transmit location information based on one digital map to a system operating on the basis of another digital map to enable the location information to be resolved in the other digital map. One context in which this may be relevant is when a central controller transmits location information to one or more remote systems. This may be carried out as part of a process for transmitting location specific information, such as weather or traffic information. In embodiments the encoder apparatus is provided by a central controller. The central controller could be a central controller of a navigation system. The decoder apparatus may be provided by a local apparatus such as a mobile communications apparatus, or a navigation apparatus in communication with the central controller.

The methods of the present invention may allow the transmission of location information associated with traffic or weather information, e.g. to users of navigation apparatus.

In some embodiments the location resolved is a location associated with weather or traffic information. In embodiments in which the ordered list of location reference points is received, the method may further comprise receiving location specific information such as weather or traffic information associated with the ordered list of location reference points, and the receiver may be arranged to do so. The method may further comprise displaying location specific information such as weather or traffic information on the second digital map associated with the resolved second location. In embodiments involving the transmission of the ordered list of location reference points, the method may further comprise transmitting location specific information such as weather or traffic information with the ordered list of location reference points, and the encoder apparatus may comprise means for so doing.

In accordance with the invention in any of its aspects or embodiments the first digital map and the second digital map may be identical. However, preferably the first digital map and the second digital map are different i.e. non identical.

In accordance with the invention in any of its aspects, the location is preferably a path, most preferably a path in a road network. The path is preferably a continuous path.

It will be appreciated that references to roads, road networks, or road segments etc may refer to any navigable thoroughfare, network or segment thereof, represented in a digital map.

As discussed above, the encoded location information or the ordered list of reference points and associated information may be transmitted from a first encoder apparatus to a second decoder apparatus. In this way a location in a first digital map may be encoded to provide machine readable data that is transmitted to a receiver system and used by the receiver system to resolve the location in the second digital map.

The present invention provides exceptional advantage over known techniques in that a potentially lengthy location can be resolved using only relatively few location reference points and the corresponding information associated therewith. From these basic elements, candidate nodes and lines or segments can be identified with reference to any modern digital map, as the invention takes advantage of the fact that most modern digital maps include practically every road intersection and provide a node for them. Furthermore, the majority of digital maps also include at least some basic attributes or properties for the form and class of roads between such intersections.

As mentioned above, a shortest path route search is useful in the route search as it is one of the simplest route search algorithms available, well known and rapid to implement and execute. A further useful advantage is the route search algorithm employed in the encoder need not necessarily be the same as that used during resolution of the location post-transmission. For example, it is possible to implement an A* on encoder side and a Dijkstra algorithm on decoder side. As both these algorithms are based primarily on a distance parameter between start and end point, they will result in the same route. In the case of A*, it should be mentioned that the heuristic element of the A* algorithm would need to meet certain requirements, but in all practical cases, this would in any event be the case. Accordingly, in embodiments of the present invention, it is only required that a shortest-path is found. In real road networks, the shortest path is usually unique, but one can imagine exceptional circumstances, such artificial grids or short routes around rectangular road layouts in cities where more than a single shortest path route may be identified.

Further advantages of the invention will become apparent from the following specific embodiment of the invention which is described by way of example with reference to the accompanying drawings.

BRIEF DESCRIPTION OF THE DRAWINGS

FIG. 2 illustrates an example network, FIG. 3 illustrates a location path desired to be encoded within that network, FIG. 4 illustrates the shortest path between start and end nodes of an extended path which partially includes that location, and FIG. 5 illustrates the location reference points required to completely reference that location, FIGS. 6-11 provide schematic representations of a second digital map including nodes and segments and in particular

DETAILED DESCRIPTION

The following description of the invention is provided in terms of segments, but it is to be understood that the method can be applied equally to lines, or to combinations of lines and segments which together are representative of a continuous path through a road network.

It is useful in the context of the present invention to firstly provide a brief description of the manner in which a location reference is encoded, and the particular logical and physical data formats used in the encoding process. The latter are provided as an Appendix to this specification, and reference to this Appendix is to be had throughout the following description.

Figure 2:
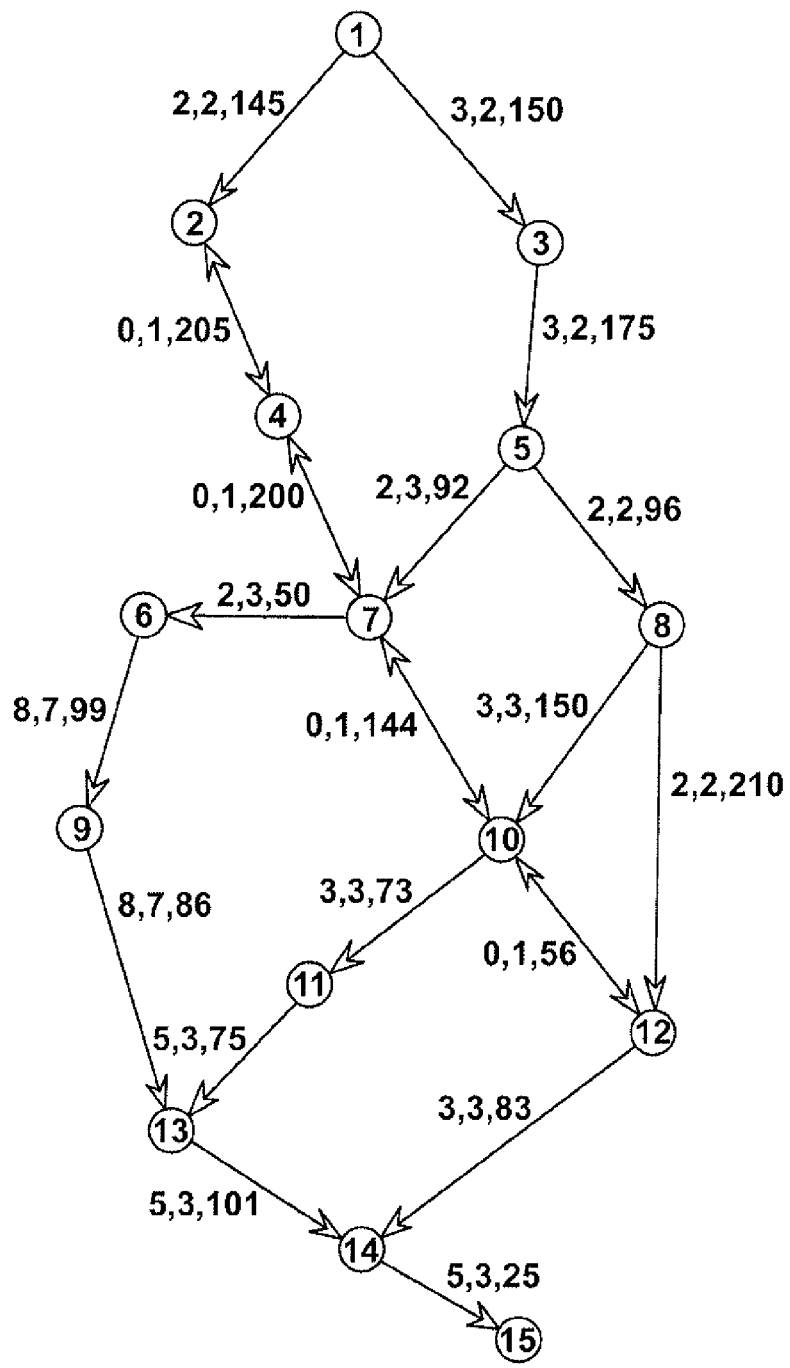
FIGS. 2-5 provide schematic representations of a first digital map including nodes and segments and in particular

Referring firstly to FIGS. 2-5, a first (encoder) digital map is shown in FIG. 2 and consists of 15 nodes and 23 lines (two-way lines are counted twice). The nodes are numbered from 1 to 15. The necessary line attributes are shown beside every line using the format: <FRC>, <FOW>, <Length in meter>. FRC is an abbreviation for "Functional Road Class" and FOW is an abbreviation for "Form of Way", both of which are described in greater detail in the Appendix below. The arrowheads indicate the possible driving direction for each line. Other attributes or properties of the lines are not shown, such as bearing, curvature or gradient.

Figure 3:
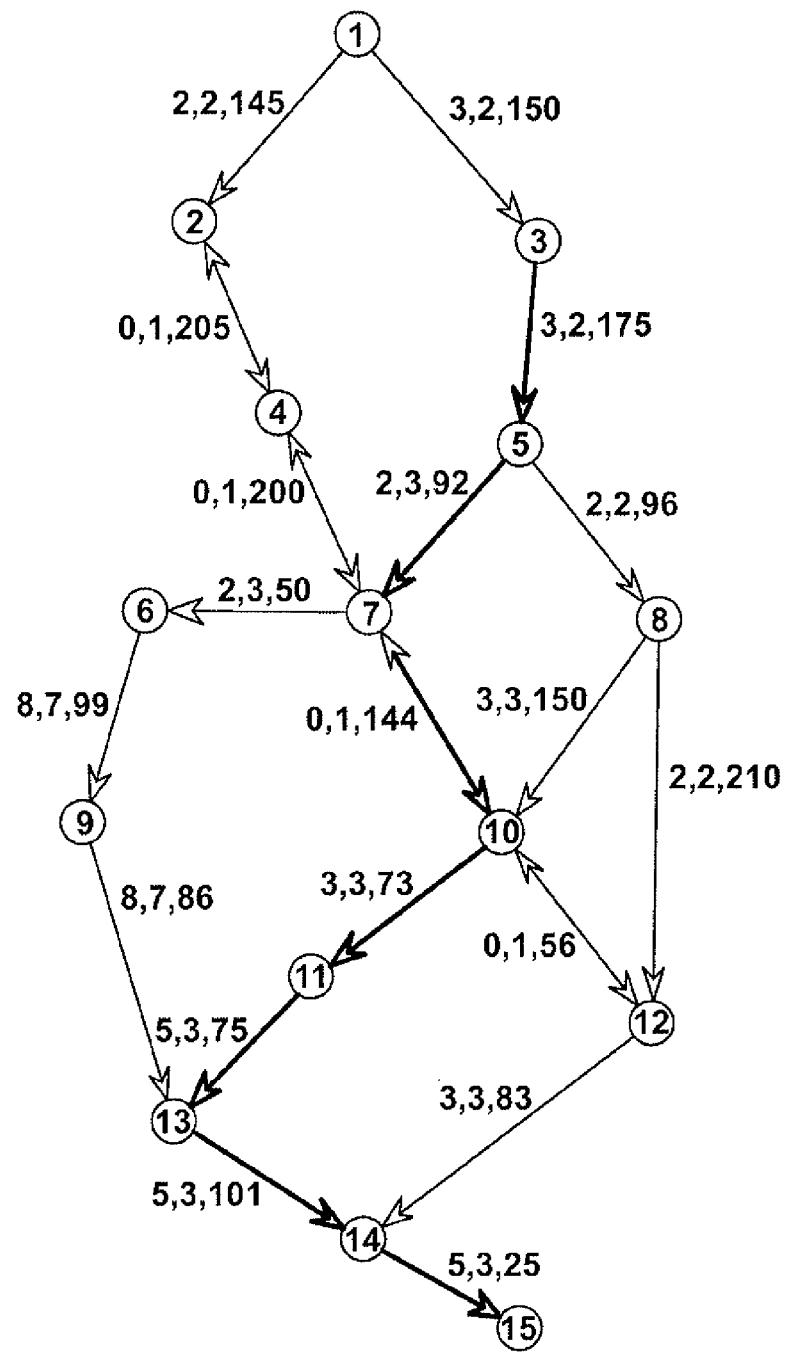
Figure 4:
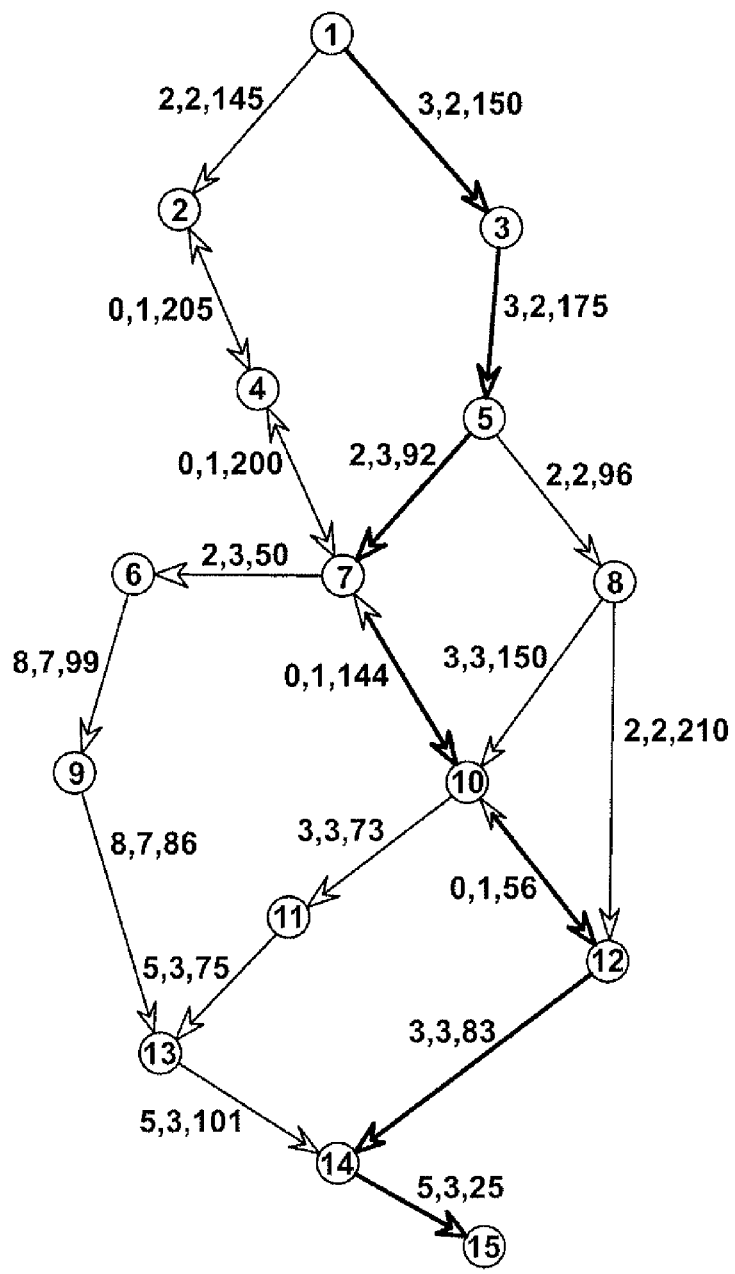

The location to be encoded is shown in FIG. 3 using bold lines. The location starts at node 3 and continues over the nodes 5, 7, 10, 11, 13, 14 and ends at node 15. Its total length in the encoder map is 685 meters. The ordered list of lines and the map to be used during encoding serves as input for the encoder.

Encoding:

In the first step of the encoding process the location will first be checked for validity. Since the location is connected and drivable and all functional road classes along the location are between 0 and 7, this location is considered valid. While it is possible in the encoding process to include a check as to whether turn restrictions within map data are enabled or not, this step is omitted for brevity here.

The encoder second step is to check the start and end node of the location as being real nodes according to certain predetermined data format rules. The end node 15 has only one incoming line and is therefore valid. The start node 3 also has two incident lines but here it is one outgoing and one incoming line. Therefore this node is not valid and the encoder searches for a real node outside the location. The encoder will find node 1 to be a real node and it also expands the location uniquely. Node 1 is chosen as the new start node for the location reference and there will be a positive offset of 150 meters. The total length of the location reference path results in 835 meters.

The third step of encoder is to proceed to calculate a shortest-path between the start line (line between nodes 1 and 3) and the end line (line between nodes 14 and 15) of the location. The resulting shortest-path is outlined in FIG. 4 using bold lines. The shortest-path has a length of 725 meters.

The next (4$^{th}$) step of the encoding process is now to check whether the location is covered by the calculated shortest-path. It will determine that this is not the case and there is a deviation after node 10.

According to the principles outlined in applicant's WO 2010/000707 A1, the encoder will determine the line from node 10 to 11 as becoming a new intermediate location reference point. Node 10 is a real node since it cannot be stepped over during route search and the shortest-path to this line covers the corresponding part of the location completely. The length of the location being covered after this first shortest-path calculation is 561 meters.

The next encoding step prepares the route calculation in order to determine a shortest-path for the remaining part of the location (from node 10 over 11, 13 and 14 to 15). The shortest-path calculation will therefore start at the line from 10 to 11 and ends at the line from 14 to 15.

The encoder returns to step 3 above and will determine a shortest path (length: 274 meters) between 10 and 15 and step 4 above will return that the location is now completely covered by the calculated shortest paths.

Figure 5:
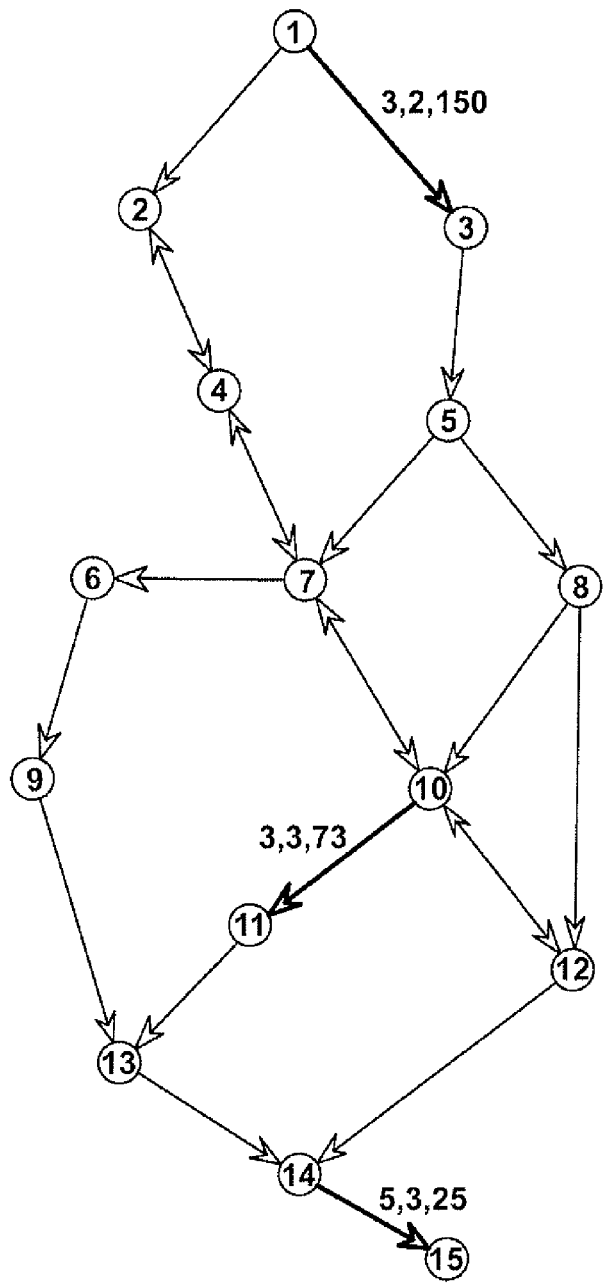

As a next step, the location reference path will be composed of the two shortest-paths and the ordered list of location reference points will now be formed. FIG. 5 shows the lines in bold which are selected for the location reference points. The first location reference point points to the line from node 1 to 3 and indicates the start of the location reference path, the second location reference point points to the line from node 10 to 11 and this line was necessary to avoid the deviation from the location. The last location reference point points to the line from node 14 to 15 and indicates the end of the location reference path.

The final step (excluding any intervening validity checks) is the conversion of the ordered list of LRPs into a Binary location reference, and the description provided in the Appendix hereof for both the Logical Data Format and Physical Data Format as prescribed by the applicant will assist in the reader's understanding. It is to be emphasised that the description provided in the Appendix and providing details of the specific formats is provided only as an example, and the skilled reader will appreciate that other formats are possible.

Turning now to the present invention, the physical data ultimately transmitted is a binary representation of the three location reference points (LRPs) identified above and includes data associated with the LRPs relating to the properties of the lines corresponding to each LRP ("attribute data") in order that the appropriate lines can be identified. The data also includes the geographic position of the LRP. In accordance with embodiments of the invention, the data includes three dimensional coordinates including an ellipsoidal height for the LRP, and data relating to the gradient and curvature of the corresponding line(s). Other attributes may be associated with the LRP relating to the relationship of the LRP other LRPs e.g. DNP (Distance to Next Point). One of the fundamental bases for this invention is that there is a strong possibility that the digital maps used in the encoder and decoder will be different. Of course, they may be the same in which case the location may be resolved slightly more quickly as candidate nodes lines will be more exactly and quickly identified, but in any event, the method of the invention must still be applied.

Figure 6:
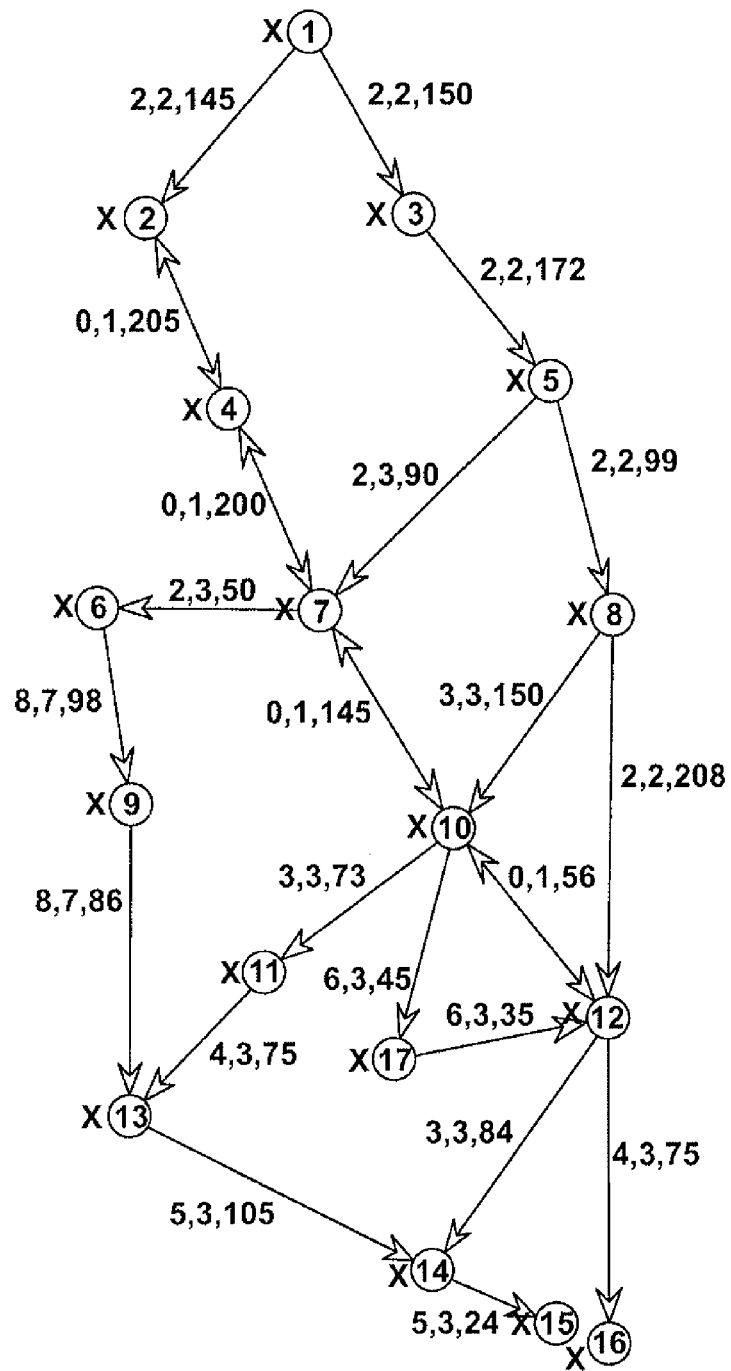
FIG. 6 illustrates the network of FIG. 2 but as represented by nodes and segments appearing in the second digital map.

Referring to FIG. 6, which shows the representation of the same portion of a road network as that shown in FIG. 2, but according to a different, second digital map. A comparison of the two Figures will immediately identify that there are material differences in the number and position of both nodes and lines.

Figure 1:
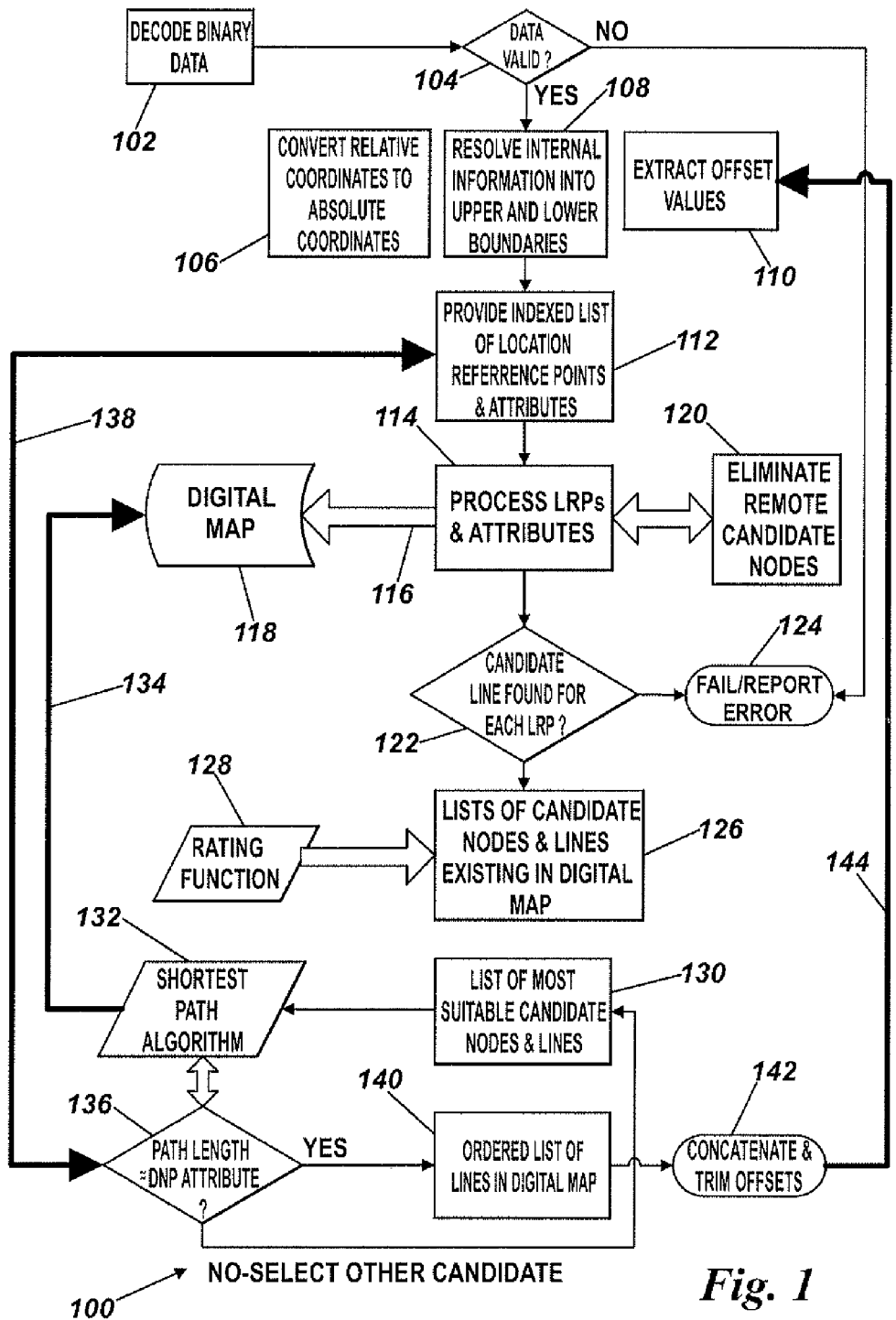
FIG. 1 shows a schematic flowchart of the method of the present invention.

Referring also to FIG. 1 in which an overview flowchart 100 of the process according to one embodiment of the invention is shown, the first step 102 in the process is to decode the incoming or wirelessly transmitted (most commonly in the case of a mobile device) binary data (or XML or other machine-readable representation) resulting from the earlier encoding process and structured according to the physical data format. The decoding of this binary data is not an essential element of the invention, which applies to the resolution of a location from a list of location reference points—the decoding of the binary data is merely a means of identifying the requisite location reference points.

At step 104, a validity check is performed—failure at this initial step will result in termination of the procedure and the reporting of an error as indicated at 124. It should be mentioned that the encoding process and reduction to physical format is a lossy process, and therefore the information extracted from the binary data will not be as accurate as before creating the binary stream. On account of the usage of intervals for the bearing and the distance to next point (DNP) the exact value cannot be extracted and therefore precision is limited to a small interval containing the exact value.

The information being extracted from the binary data example is shown in Tables 1, 2 and 3 (and is further referenced in FIG. 1 at steps 106, 108, and 110 respectively). Although not shown in Table 1 below, in accordance with the invention, a third ellipsoidal height coordinate is associated with each LRP and extracted from the data. Furthermore, although not shown in Table 1, curvature and gradient information is associated with each LRP, and extracted from the data in a similar manner to the other information found in Table 2. The curvature and gradient information will include an indication as to the direction of curvature or gradient, a value for the curvature or gradient, and a distance of validity of the curvature or gradient.

TABLE 1

Decoded coordinates

| LRP index | Longitude | Latitude |
|---|---|---|
| 1 | 6.12682° | 49.60850° |
| 2 | 6.12838° | 49.60397° |
| 3 | 6.12817° | 49.60304° |

TABLE 2

Decoded LRP information

| LRP index | FRC | FOW | Bearing | LFRCNP | DNP |
|---|---|---|---|---|---|
| 1 | FRC3 | MULTIPLE_CARRIAGEWAY | 135.00°-146.25° | FRC3 | 527.4 m-586.0 m |
| 2 | FRC3 | SINGLE_CARRIAGEWAY | 225.00°-236.25° | FRC5 | 234.4 m-293.0 m |
| 3 | FRC5 | SINGLE_CARRIAGEWAY | 281.25°-292.50° | — | 0 m |

TABLE 3

Decoded offset information

| Offset | Value |
|---|---|
| Positive offset | 117.2 m-175.8 m |
| Negative offset | -no offset available- |

This information is sufficient to resolve the location on the decoder map shown in FIG. 6. This map consists of 17 nodes and 26 lines (two-way lines are counted twice). To avoid confusion, all nodes referenced in the decoder map are prefaced with "X".

This map differs from the encoder map (see FIG. 2) in several ways. Some length values are different (e.g. line from node X3 to X5), some functional road class values have changed (e.g. line from node X3 X5) and there are two more nodes X16 and X17 and also additional lines connecting these new nodes. The challenge of the decoder is to resolve the location in this different map.

Figure 7:
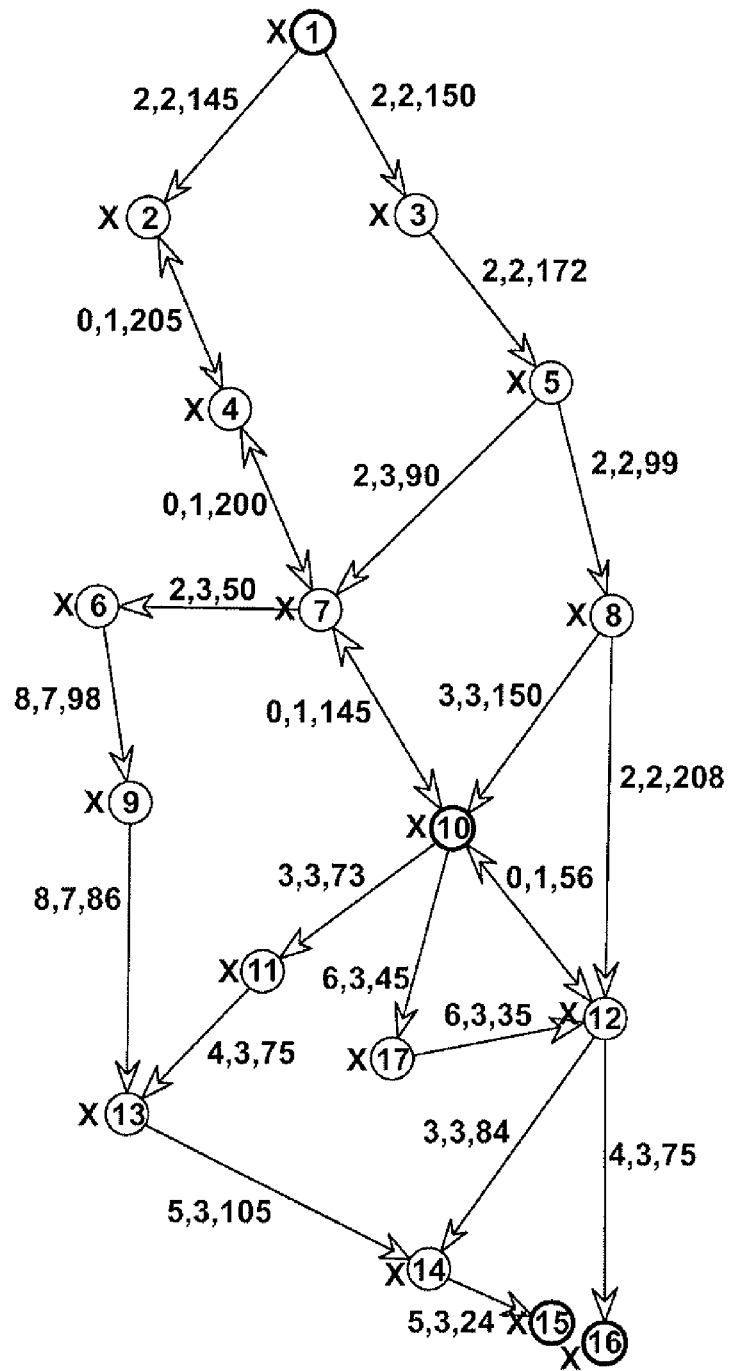
FIG. 7 illustrates candidate nodes identified within the second digital map.

After validating the data, and providing a list of decoded location reference points (LRPs), their coordinates and their attributes, as indicated at step 112 in FIG. 1, the decoder then begins processing each LRP in the list at step 114 to firstly determine candidate nodes for each LRP. The result of this processing, which is effected by using the LRP coordinates and identifying the nearest node(s) appearing in the decoder digital map 118 (as indicated generally at 116) is to provide a list of candidate nodes for each LRP. This step may be carried out by reference to two dimensional coordinates for the LRP i.e. excluding the ellipsoidal height coordinate. Map Nodes being distant from the LRPs by greater than a predetermined threshold value can be eliminated, as shown at 120. FIG. 7 shows the candidate nodes (bold circle) which are positioned close by the longitudinal and latitudinal coordinates of the location reference points. For the location reference point 1 and 2 (in tables 1 & 2 above), in this example, there exists only one candidate node but for the last location reference point two candidate nodes X15 and X16 are possible.

Figure 8:
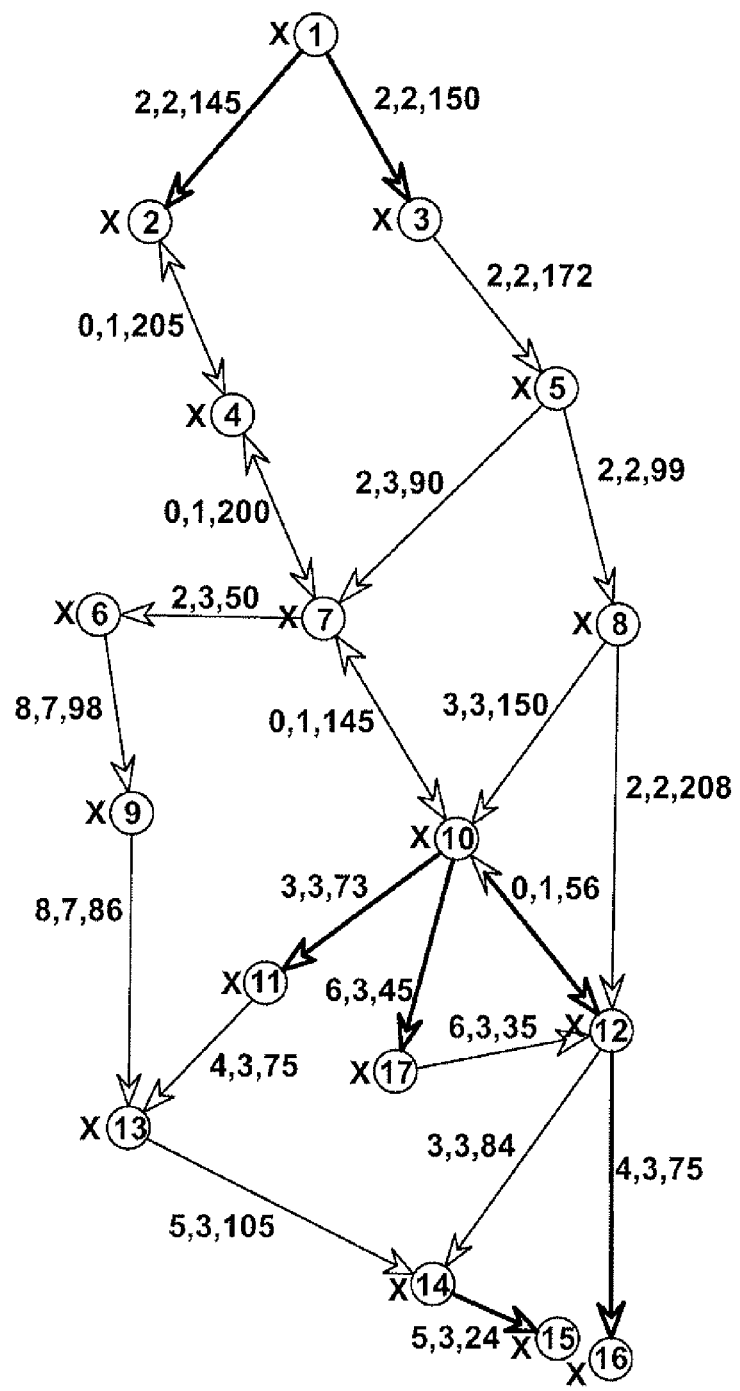
FIG. 8 illustrates the candidate lines identified within the second digital map.

Also as part of the processing of the LRPs and their attributes, candidate lines for each location reference point are also identified. The bold lines in FIG. 8 are the candidate lines for this example. The first LRP is represented by candidate point X1 which in turn has two outgoing lines as candidates, the second LRP having candidate point X10 has three outgoing lines as candidate and the last location reference point has two incoming lines (one for each candidate node X15 and X16). If the processing conducted at 114 fails to identify a candidate line for any of the LRPs, then the process must fail, as indicated at 122, 124. Once the processing is complete, list(s) of candidate nodes and lines for each LRP are provided at 126.

The embodiments of the present invention provide the ability to better determine the best match when multiple candidate nodes and/or lines are identified in the second digital map. In the example of FIG. 8, it has been shown that two candidate nodes, X15 and X 16 are possible matches for the last LRP. These candidate nodes will typically be identified using only the longitudinal and latitudinal coordinate information for the corresponding LRP and listed in step 126 (FIG. 1). While these nodes are close to one another when taking into account only the longitudinal and latitudinal coordinates, they may differ significantly in elevation. This would be the case, for example, in a stacked type interchange, where two or more complex highways come together at different vertical levels to result in nodes or intersections at different vertical levels, but closely similar position based on latitude and longitude.

Accordingly, as the coordinate information for each LRP additionally includes ellipsoidal height information as shown in Table 1, the ellipsoidal height information may be used in a further step to determine which of the candidate nodes X15 or X16 is the better match to the coordinates of the LRP. Thus an initial identification of candidate nodes may be carried out on the basis of longitudinal and latitudinal coordinate information associated with an LRP. If multiple candidate nodes are identified, the most likely node may be determined by additionally taking into account ellipsoidal height coordinate information associated with the LRP. This may be achieved in any manner. In preferred embodiments described below, the candidate lines are compared using a rating function 128 of FIG. 1, using the ellipsoidal height information.

Turning to the identification of candidate lines, as mentioned above, multiple candidate lines may also be identified and listed in step 126 of FIG. 1. Referring to the example of FIG. 8, for node X10, three outgoing lines are identified candidates. The candidate lines may simply be all outgoing lines from the node X10, or may be lines which have been preselected with reference to certain of the information associated with the LRP other than curvature and gradient information for the line e.g. as shown in Table 2, such as class of road, direction of travel etc. In accordance with the invention, curvature and/or gradient information for the corresponding line is additionally associated with each LRP and used to distinguish between multiple candidate lines identified such as using a rating function 128.

While in the example of FIG. 8, a bearing attribute is associated with each LRP as described in WO 2010/000706, it has been found that often lines may have relatively small angular separation such that a bearing attribute may not unambiguously identify a most likely candidate line for an LRP. However, such lines may have significantly different gradient and/or curvature. For example of two paths with a small angular split, one path may go down a gradient and another may go up. Likewise, two paths might have the same bearing as calculated herein, but may have distinct horizontal curvature profiles.

In embodiments of the invention, when multiple candidate lines are identified, the curvature and/or gradient information associated with the corresponding LRP is used to determine the most likely line in the second digital map. As in relation to the identification of a most likely node, determining of a most likely candidate line may proceed in any manner provided it involves using the curvature and/or gradient information. For example the curvature and/or gradient information may be used to distinguish between two lines which have already been identified and which could not be distinguished on the basis of other information associated with the LRP, or could be used together with other information. In either case, the curvature and/or gradient information is preferably used in a rating step as described below.

It will be appreciated that while in preferred embodiments elevation information e.g. ellipsoidal height information is associated with each LRP to describe the position of the node represented thereby, and curvature and gradient information for the corresponding lines is additionally associated with the LRP, it is not necessary that all of this information is associated with each LRP. For example, any combination of at least one of ellipsoidal height information for the LRP and curvature information or gradient information for the corresponding lines may be associated with an LRP to provide benefits in distinguishing between multiple candidate nodes or lines. Likewise, determining a most likely candidate line may not involve using both gradient and curvature information where provided, but may be carried out using gradient or curvature information.

When more than one candidate node and/or line is identified for each LRP, some means of rating or ranking the candidates is used. Accordingly, a rating function 128 is applied to the lists of candidate nodes and/or lines (preferably both) according to their compliance with the attributes and other information associated with the location reference point. Generally, the important aspect to the rating function is that its application will result in a ranking of one or preferably both of the candidate nodes and lines according to one or more metrics. As described above, in accordance with the invention, rating or ranking of candidate nodes is based, at least in part, on the ellipsoidal height of the LRP. Rating or ranking of candidate lines is based, at least in part, on the curvature of a corresponding line, or the gradient of a corresponding line.

The skilled reader will appreciate that many different mathematical and/or statistical bases exist for rating functions, and in the context of this application therefore it is sufficient to explain that a rating function or part thereof specific to nodes is based on at least the ellipsoidal height of the LRP. In addition, the rating function for candidate nodes may include some measure of the distance of candidate nodes to the physical or geographic position of the decoded LRP on the basis of latitudinal and longitudinal coordinate information. A rating function or part thereof specific to candidate lines is based on one or both of gradient or curvature of the line, and may include some means of assessing the correlation between the type of candidate line identified and those represented in the decoded data, e.g. by reference to type of line, and possibly also some bearing of those candidate and identified lines. It will be appreciated that a single rating function may be used with parts relevant to lines and nodes respectively.

The rating function compares various parameters of the nodes and/or lines in the second map to values for the first digital map e.g. found in data of the first digital map. The smaller the differences between the parameters and the values for the first digital map, the higher the rating value ascribed. A rating function may combine ratings for multiple parameters and combine them into a single value. A higher value may correspond to a better match.

In one example a rating function takes into account a distance between the coordinates of the start (or end) node and the coordinates found in the data, a difference of the angle data of the candidate line and the value found in the data, a difference of a height of a candidate node and the value found in the data, a difference of the functional road class value of the candidate line and the value found in the data, and a difference of the form of way of the candidate line and the value found in the data.

Figure 9:
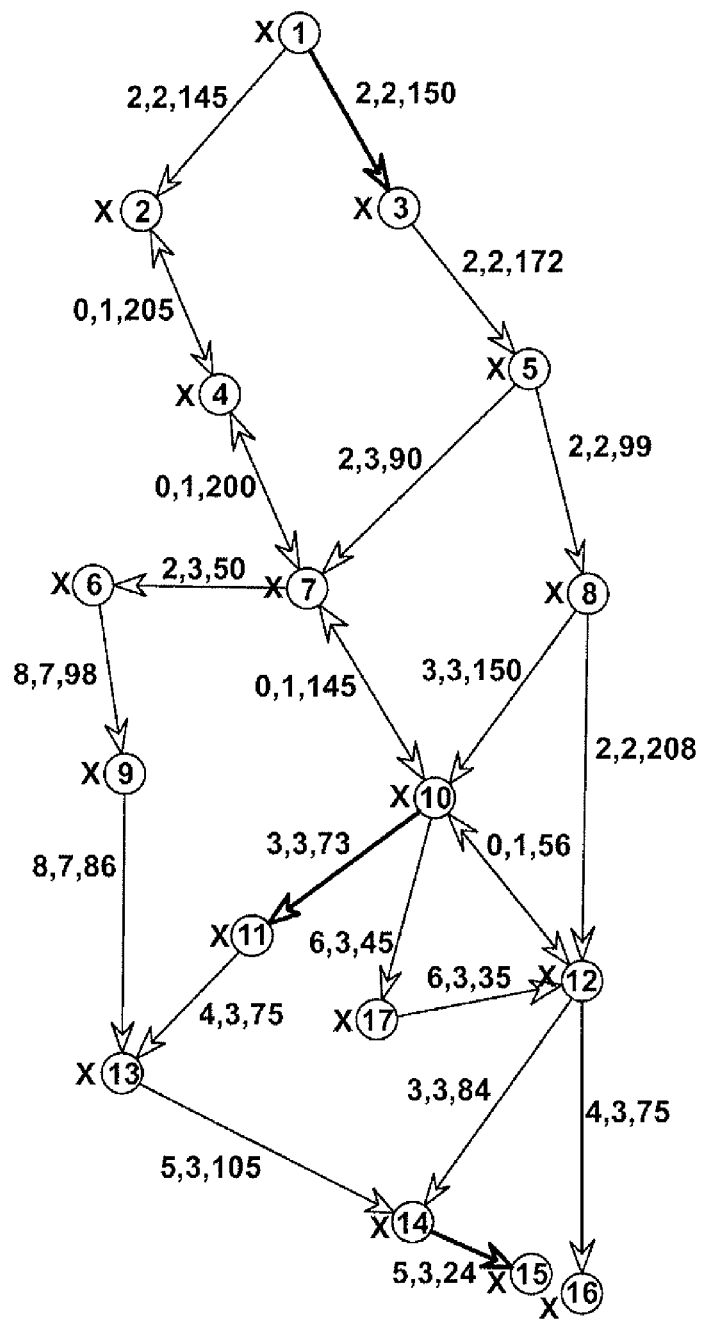
FIG. 9 illustrates the most likely candidate lines by which the location is completely referenced.

Once the rating function has been applied, most likely candidates are identified at step 130 in FIG. 1, and this can be seen in the network illustrated in FIG. 9—specifically, the most likely candidate lines are those between nodes X1 and X3, between X10 and X11, and between X14 and X15. These lines will be used for the following shortest-path calculation in step 132 of the resolution process.

Figure 10:
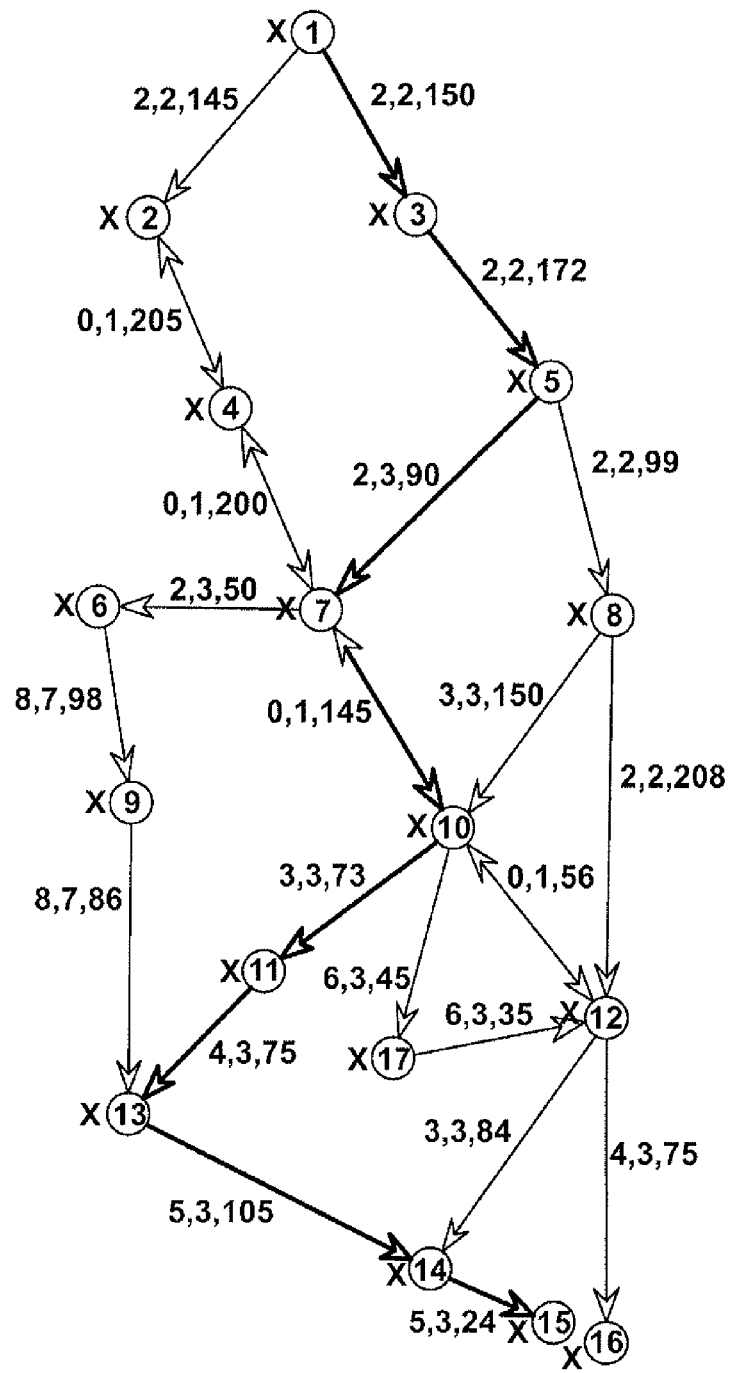
FIG. 10 shows the shortest path as algorithmically determined between the most likely lines.
Figure 11:
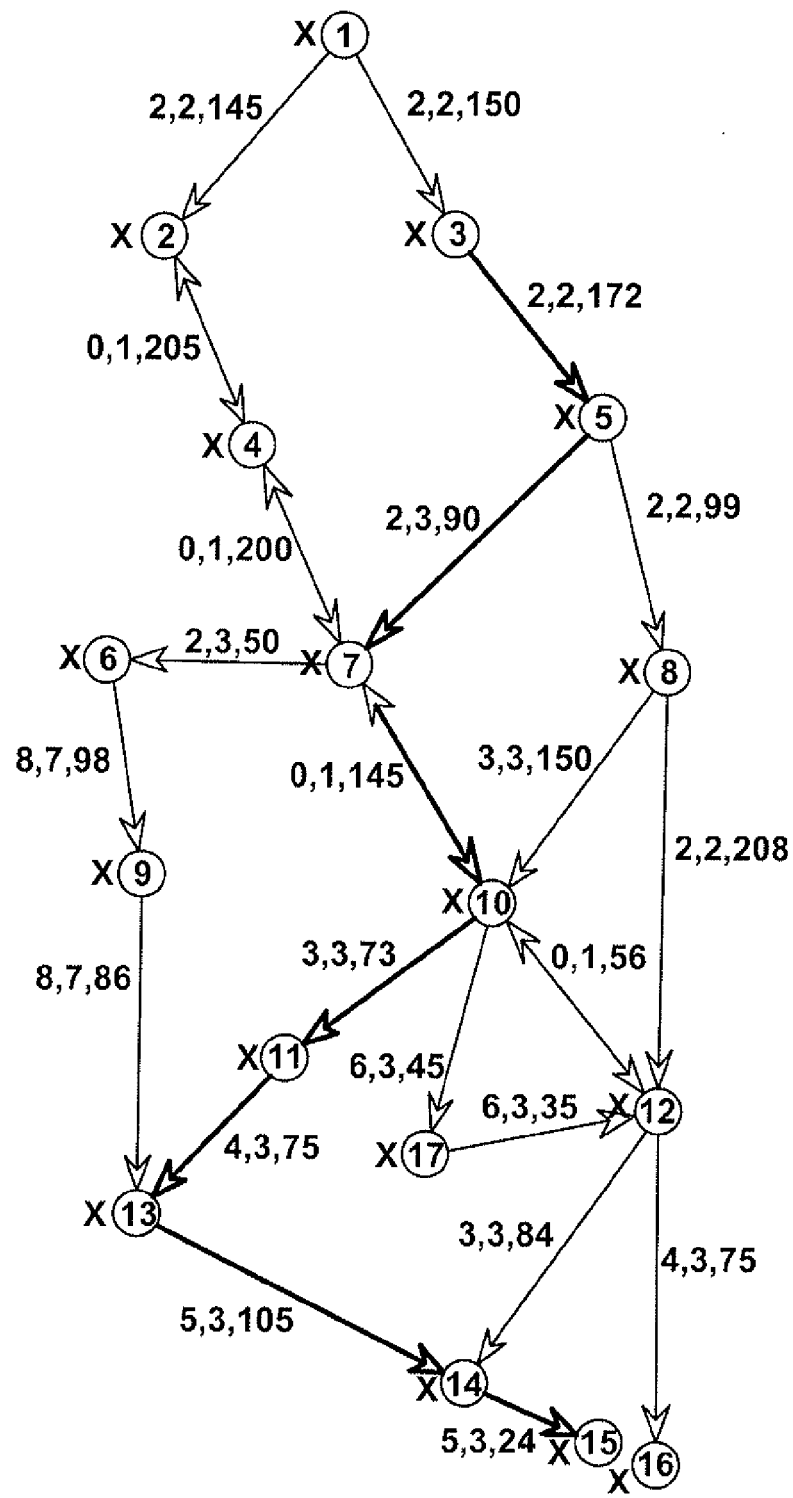
FIG. 11 shows the location as resolved, FIGS. 12-20 provide various schematic illustrations useful in the context of the logical and physical data formats, described below, and specifically.

The shortest-path calculation is performed on each successive pair of LRPs starting with the first and the second LRPs, and as shown by arrow 134 in FIG. 1, this shortest path algorithm determines a route through the digital map 118 using said most likely candidate nodes and lines resulting ultimately in the identification of the route shown in FIG. 10. Each shortest path so determined may be validated in step 136 by determining a path length value between the start node and end node of that path, and then comparing this value to the available DNP attribute specified in the data for each LRP, as indicated by arrow 138. The length of the first shortest-path (from node X1 to node X10) is 557 meters and this value fits into the DNP interval of the first LRP seen above in Table 2 (527.4 meters-586.0 meters). The length of the second shortest-path (from node X10 to node X15) is 277 meters and this value also fits into the DNP interval of the second LRP (234.4 meters-293.0 meters). The shortest-paths are therefore validated and the decoder does not fail but instead proceeds to steps 140 and 142, firstly providing a concatenated format, i.e. an ordered list of all the lines present in the complete path, and finally in step 142, trimming the concatenated shortest-path according to the offsets retrieved as shown schematically by arrow 144. In this example, only a positive offset is provided and therefore the shortest path is trimmed at its start, as clearly shown in FIG. 11. The only node fitting in the positive offset interval (Table 3 above, 117.2 meters-175.8 meters) is node X3.

As can be seen from the above, the present invention provides a highly reliable and efficient method of resolving a location from received encoded data, and in particular may resolve locations accurately even when multiple possibilities exist in the second digital map for candidate nodes and/or candidate lines. This may be achieved with only 12 additional bytes data needing to be stored to include height, gradient and curvature information. It has been found that the invention may allow situations to be rectified where two or more original maps use different modelling specifications for node positioning. LRPs may be built out of raw or semi-processed probe data for comparison against standard topologically integrated navigational maps. Locations may be resolved in a second map where the location has been referenced from an incomplete map or data set, such as a set of probe data.

The particulars of the logical and physical data formats are now provided by way of example. The reader should be aware that the following Appendix provides only one of many possible specific definitions for these formats.

The example given in the Appendix is consistent with the disclosure of WO 2010/000706 A1. In accordance with embodiments of the present invention, the logical and physical data format will differ in the following manners.

The LRP will contain a set of three coordinates, specified in WGS84, including longitude, latitude and ellipsoidal height values.

The LRP is associated with information relating to the curvature and gradient of each corresponding line.

The definition of an LRP will be modified by means of bits contained within the status byte (see 1.5.2 below). One of the bits reserved for future use, RFU may be modified to act as a flag indicating that 3D coordinates are present for the LRP. The bit will have value 1 when the ellipsoidal height coordinate is used. One or more additional bits labelled RFU may be used to indicate whether additional attribute information in the form of curvature and/or gradient information for a corresponding line is present.

Some further details in relation to each of these additional parameters will now be given.

Ellipsoidal Height

Ellipsoidal height may be determined for the location of an LRP in one of a number of ways.

Ellipsoidal height may be a feature of the original map database of the first digital map in which case it may be copied directly from the database i.e. for the given node.

There may be a standardized linear referenced resource that is an adjunct to the first digital map database. This linear reference resource could be e.g. a GPS probe trace or some other product of a mobile survey. In this case a spatial lookup may be used to determine a relevant height value based upon a spatial tolerance. The lookup may map to a node or vertex in the data stream.

In yet another alternative, a standardized Digital Terrain Map (DTM) may be used. DTMs of different resolutions, although preferably less than 10 m may be used. The DTM should take into account the built-up area within and around the road bed. This could be based upon Light Detection And Ranging (LIDAR), Mobile Mapping Laser Point Clouds or various other DTM construction techniques. A raster look up may be used.

Figure 21:
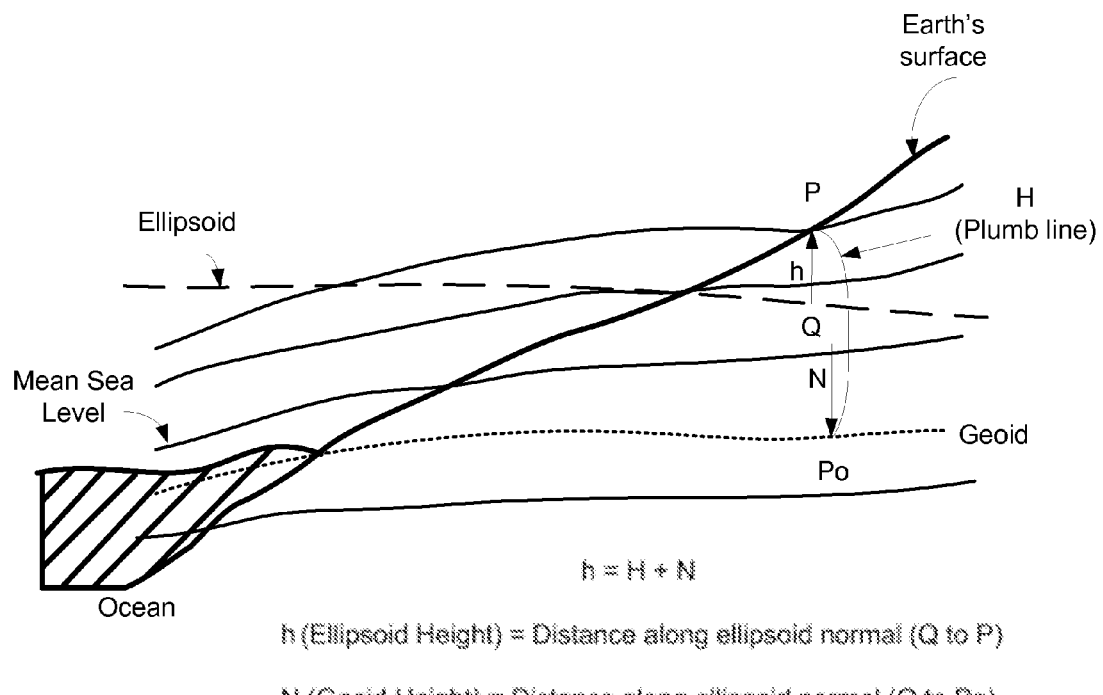
FIG. 21 illustrates some baseline references which may be used to calculate elevation or ellipsoidal height.

FIG. 21 illustrates some baseline references which may be used to calculate elevation or ellipsoidal height. The Ellipsoid height (h) is the distance along the ellipsoid normal Q to P. The Geoid Height (N) is the distance along the ellipsoid normal Q to $P_o$. The Orthometric Height (H) is the distance along the plumb line $P_o$ to P. The ellipsoid height h is the sum of the Geoid Height N and the Orthometric Height H.

Gradient

The gradient describes the gradient flowing in and/or out of the LRP i.e. node along the line incident thereto or emanating therefrom. The gradient information associated with the LRP includes an indication of the direction of the gradient, the gradient value, and preferably a validity distance for the gradient value for one or both directions into and out of the LRP.

The line i.e. road gradient may be determined in one of several ways.

The gradient may be a feature of the original map database of the first digital map in which case it may be copied directly from the database i.e. for the given node.

There may be a standardized linear referenced resource that is an adjunct to the first digital map database. This linear reference resource could be e.g. a GPS probe trace or some other product of a mobile survey. In this case a spatial lookup or conflation may be used to determine a relevant gradient value for the incoming and outgoing paths from the location reference point.

In yet another alternative, a standardized Digital Terrain Map (DTM) may be used. DTMs of different resolutions, although preferably less than 10 m may be used. The DTM should take into account the built-up area within and around the road bed. This could be based upon Light Detection And Ranging (LIDAR), Mobile Mapping Laser Point Clouds or various other DTM construction techniques. A raster look up may be used. In exemplary techniques, to determine if a road bed is properly accounted for, several readings may be taken along the input roadway. If there are stark undulations in the DTM readings as determined by an input parameter then gradient for the LRP may be omitted.

A validity distance is estimated for each of the directions into and out of the node in the first map represented by the LRP along the line. By way of example, validity distances my range from 20 m to 100 m. The validity distance will depend upon the nature of the location. The validity distance should be chosen so as to reflect the variability between different paths i.e. lines at the node to enable them to be distinguished from one another, rather than to accurately reproduce the terrain. Thus it is the relative gradient that is important.

Figure 22:
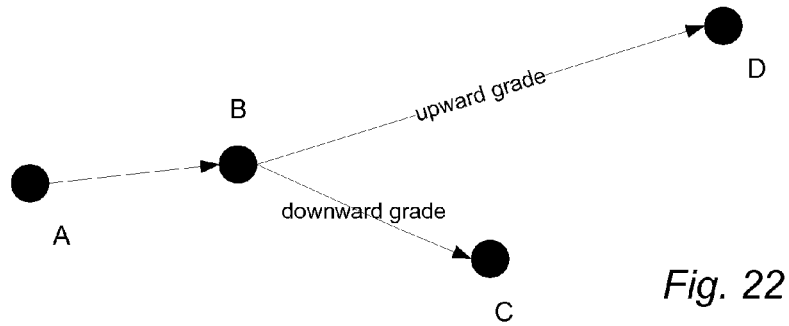
FIG. 22 illustrates an example in which different lines associated with a node have different gradients.

FIG. 22 illustrates a scenario in which ABC and ABD represent potential paths flowing through a node B. The section BC contains a downward gradient flowing away from B, while BD contains an upward gradient flowing away from BD. This illustrates the way in which gradient may help to distinguish between otherwise similar paths.

Curvature

The curvature describes the radius of curvature flowing in and/or out of the LRP i.e. node along the corresponding line as a circular radius. The radius may be expressed in degrees or radians or quantized values.

The line i.e. road curvature may be determined in one of several ways.

The curvature may be a feature of the original map database of the first digital map in which case it may be copied directly from the database i.e. for the given node.

If the curvature is not stored in the map database, but the map database model is determined to be of suitable geometric accuracy, such as Advanced Driver Assistance System (ADAS) compliant, it may be possible to compute the inflowing or outflowing curvature radius from the map data. It may be necessary to look ahead or back in order to extrapolate.

There may be a standardized linear reference resource that is an adjunct to the first map database, such as a GPS probe trace or some other product of a mobile survey. In this case, a spatial look up or conflation can be used to determine a relevant curvature value for incoming and outgoing paths for the LRP.

A fit location is estimated to indicate where the hypothetical circle defining the radius of curvature contacts the line corresponding to the node represented by the LRP. The units of the fit location express a distance along the line outward from the node. The validity distance, being the distance from the node to the fit location along the line, represents the distance along the line over which the curvature may be considered to be valid. As described with reference to validity distance for the gradient above, the validity distance for curvature is intended to be such that it will enable the curvature to be used to distinguish lines from one another, and so should represent the distance over which the curvature value is applicable to a level which will allow relative curvature differences between lines to be identified, rather than accurately reflecting the terrain.

A direction of curvature is also stored.

Figure 23A:
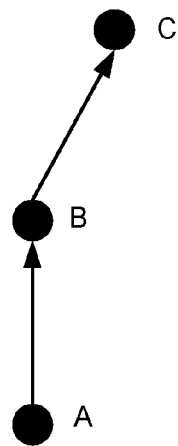
FIGS. 23a-c illustrate the way in which curvature may be determined for lines.
Figure 23B:
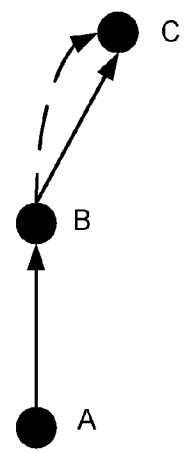
Figure 23C:
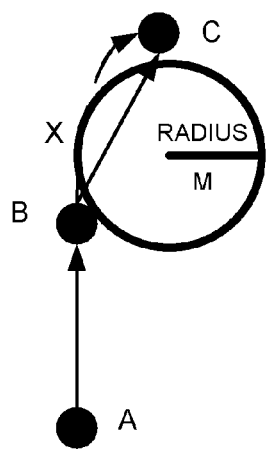

FIG. 23a-c illustrate the way in which a radius of curvature may be derived for a line BC emanating from the LRP/node B. The solid lines in FIG. 23a represent the abstracted lines of a path ABC which is represented in an ordered list of LRPs in accordance with the invention. The dashed line of FIG. 23b represents the actual driven path from B to C. The circle in FIG. 23c indicates a fitted circle that approximates the curvature of the actual driven path BC.

The curvature is defined as the reciprocal of the radius of the fitted circle i.e. 1/M. The value of 1/M is stored together with a validity distance, being the distance from the node to the fit location X where the circle contacts the actual driven path between B and C.

Data Structure

Coordinates

A data model for a set of coordinates including ellipsoidal height is shown below.

| Byte | Latitude | | Longitude | | Ellipsoidal Height | |
|---|---|---|---|---|---|---|
| 2 | Lower bound −36459 m | Upper bound 36460 m | Lower bound 36459 m | Upper bound 36460 m | Lower bound −10000 m | Upper bound 10000 m |

Gradient

It is assumed that a road gradient may be represented by a single byte pair for each of the directions of inflow and outflow to a node. One value in the pair represents the validity distance, and the other the gradient in %. A positive gradient value indicates a rise in elevation and a negative value a drop in elevation. The orientations of the value assume that one is facing outward from the node. The gradient values are scaled −20% to +20%.

| Byte | Valid Distance | | Inflow Gradient | |
|---|---|---|---|---|
| 1 | Lower bound 0 [null] | Upper bound 255 m | Lower bound −20% | Upper bound 20% |

| Byte | Valid Distance | | Outflow Gradient | |
|---|---|---|---|---|
| 1 | Lower bound 0 [null] | Upper bound 255 m | Lower bound −20% | Upper bound 20% |

Curvature

It is assumed that the road curvature may be represented by a single byte pair for each of the directions of inflow and outflow to a node. There will be a pair of bytes for each direction. One value in the pair represents a fit location, in terms of meters along the line from the node to the point at which the hypothetical circle touches the line. The other value is a linear scaled value derived from 1/[radius M]. A negative value of curvature represents a right curve and a positive value indicates a left curve. The orientations of the value assume we are facing outward from the node.

In the example, radius of curvature is computed (M). The reciprocal 1/M is then derived, and it is assumed that the maximum absolute value of 1/M is 0.02. The sign denoting direction of curvature is added and the values scaled between −100 and +100.

| Byte | Circle Fit Location | | Inflow Curvature | |
|---|---|---|---|---|
| 1 | Lower bound 0 [null] | Upper bound 255 m | Lower bound −100 | Upper bound 100 |

| Byte | Circle Fit Location | | Outflow Curvature | |
|---|---|---|---|---|
| 1 | Lower bound 0 [null] | Upper bound 255 m | Lower bound −100 | Upper bound 100 |

APPENDIX—A

Specification for Logical Data Format & Physical Data Format

The following table explains common terms and abbreviations used in this document and in the context of location referencing:

TABLE A1

Explanation of common abbreviations

| Abbreviation | Description |
|---|---|
| AF | Attribute Flag—a flag which indicates that the binary representation of the location reference includes attribute information |
| ArF | Area Flag—a flag which indicates that the location reference describes an area |
| BEAR | Bearing—angle between the direction to a point in the network and a reference direction (here: the true North) |
| COORD | Coordinates—a pair of two values (longitude and latitude) representing a position in a two-dimensional network |
| DNP | Distance to Next Point—the length in meter to the next location reference point (measured along the location reference path between these two LRP) |
| FOW | Form Of Way—Certain aspects of the physical form that a line takes. It is based on a number of certain physical and traffic properties. |
| FRC | Functional Road Class—A classification based on the importance of the role that the line performs in the connectivity of the total road network. |
| lat | Latitude—geographic coordinate used for north-south measurement |
| LFRCNP | Lowest Functional Road Class to Next Point |
| lon | Longitude—geographic coordinate used for east-west measurement |
| LRP | Location Reference Point—a point of the location which holds relevant information enabling a map-independent location reference; typically a collection of information describing an object in the map; consists of a coordinate and additional information about a line in the map. |
| NOFF | Negative Offset—distance in meter along the location reference path between the real end of the location and the end of the location reference path |
| NOffF | Negative Offset Flag—a flag which indicates that a negative offset is included in the location reference |
| POFF | Positive Offset—distance in meter along the location reference path between the start of the location reference path and the real start of the location |
| POffF | Positive Offset Flag—a flag which indicates that a negative offset is included in the location reference |
| RFU | Reserved for future use—a bit in a binary stream which does not have a use yet |
| VER | Version—Version information |

1. Data Format

A location reference is a description of a designated part of a digital map or a sequence of geographical positions. For this description we use the model of location reference points (LRPs, see 1.1.1).

A location reference for line locations contains at least two LRPs but there is no maximum number of LRPs defined. The location reference path is the path in the digital map described by the LRPs and can be found by a shortest-path calculation between each consecutive pair of LRPs.

1.1 Logical Data Format Specification

The logical data format describes the logical model for location references according to the MapLoc™ standard.

1.1.1. Location Reference Point (LRP)

The basis of a location reference is a sequence of location reference points (LRPs). Such a LRP contains a coordinate pair, specified in WGS84 longitude and latitude values and additionally several attributes.

The coordinate pair (see 1.1.3.1) represents a geographical position within a map/network and is mandatory for a LRP. The coordinate pair belongs to a "real" node within a network.

The attributes (see section 1.1.3.2 to 1.1.3.6) describe values of a line within a network at which the line is incident to the node described by the coordinate pair. In this context it is not defined if the attributes refer to an incoming or outgoing line regarding the node. This will be specified in section 1.2.

1.1.2. Topological Connection of LRPs

Figure 12:
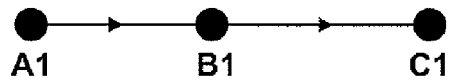
FIG. 12 shows the required consecutive connection of location reference points (LRPs)

Referring to FIG. 12, The location reference points shall be stored in a topological order or "next point"-relationship of successive LRPs. The last point in this order will have no next point in this relationship.

FIG. 12 shows an example of this relationship. The LRPs are indicated by A1, B1 and C1 and the black lines and arrows indicate the order of the points from A1 to C1 in the location reference path. In this example the LRP A1 will have B1 as next point, B1 will have C1 as next point and C1 will have no next point.

1.1.3. Components of LRPs

This section describes the components of a location reference point.

1.1.3.1 Coordinate Pair

Coordinate pair stands for a pair of WGS84 longitude (lon) and latitude (lat) values. This coordinate pair specifies a geometric point in a digital map. The lon and lat values are stored in a decamicrodegrees resolution ($10^{-5}$, or five decimal points).

Abbreviation: COORD Type: (float, float)

1.1.3.2 Functional Road Class

The functional road class (FRC) is a road classification based on the importance of a road. The possible values of the FRC attribute are shown in Table A2. If there are more FRC values defined than these 8 location reference values then a proper mapping needs to be done or less important classes needs to be ignored.

TABLE A2

Logical format: Functional road class

FRC

FRC 0—Main road
FRC 1—First class road
FRC 2—Second class road
FRC 3—Third class road
FRC 4—Fourth class road
FRC 5—Fifth class road
FRC 6—Sixth class road
FRC 7—Other class road Abbreviation: FRC Type: integer 1.1.3.3 Form of Way The form of way (FOW) describes the physical road type. The possible values of the FOW attribute are shown in Table A3.

TABLE A3

Logical Format: Form of way

| FOW | Description |
|---|---|
| UNDEFINED | The physical road type is unknown. |
| MOTORWAY | A Motorway is defined as a road permitted for motorized vehicles only in combination with a prescribed minimum speed. It has two or more physically separated carriageways and no single level-crossings. |
| MULTIPLE_CARRIAGEWAY | A multiple carriageway is defined as a road with physically separated carriageways regardless of the number of lanes. If a road is also a motorway, it should be coded as such and not as a multiple carriageway. |
| SINGLE_CARRIAGEWAY | All roads without separate carriageways are considered as roads with a single carriageway. |

TABLE A3-continued

Logical Format: Form of way

| FOW | Description |
| --- | --- |
| ROUNDABOUT | A Roundabout is a road which forms a ring on which traffic travelling in only one direction is allowed. |
| TRAFFICSQUARE | A Traffic Square is an open area (partly) enclosed by roads which is used for non-traffic purposes and which is not a Roundabout. |
| SLIPROAD | A Slip Road is a road especially designed to enter or leave a line. |
| OTHER | The physical road type is known but does not fit into one of the other categories. |

Abbreviation: FOW Type: integer 1.1.3.4 Bearing

The bearing (BEAR) describes the angle between the true North and a line which is defined by the coordinate of the LRP and a coordinate which is BEARDIST along the line defined by the LRP attributes. If the line length is less than BEARDIST then the opposite point of the line is used (regardless of BEARDIST). The bearing is measured in degrees and always positive (measuring clockwise from North). The parameter BEARDIST is defined in Table A4.

Abbreviation: BEAR Type: integer

TABLE A4

Logical format: Parameter BEARDIST

| Abbreviation | Description | Value | Unit |
| --- | --- | --- | --- |
| BEARDIST | distance between two coordinates which form a line for the calculation of the bearing value | 20 | meters |

Figure 13:
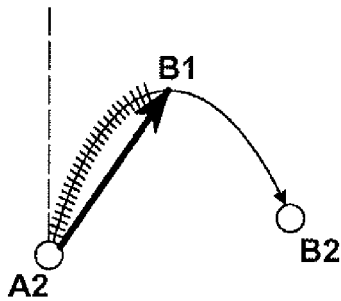
FIG. 13 illustrates how a bearing is calculated for one LRP as regards a following LRP.

FIG. 13 shows how the second point for the bearing calculation is determined. The figure shows a line from A2 to B2 which is longer than BEARDIST. The shaded part of this line is exactly BEARDIST meters long so that the point marked with B' is BEARDIST meters away from A2 traversing along the line from A2 to B2. The straight line from A2 to B' is now considered for the calculation of the bearing value. Note, this is different to the angle that would have been calculated if the opposite node of line (in this case, this would be B2) is used.

Figure 14:
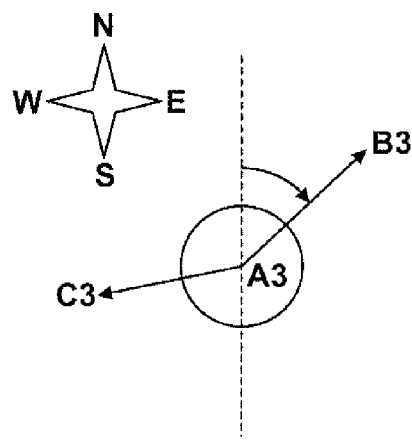
FIG. 14 shows how bearings can vary, FIG. 15 demonstrates how a "distance to next point" attribute is determined for a LRP.

FIG. 14 shows two examples of the bearing value calculation. There are two lines, one from A3 to B3 and one from A3 to C3. For both lines the arcs indicate the angles to the North.

1.1.3.5 Distance to Next LRP

This DNP field describes the distance to the next LRP in the topological connection of the LRPs. The distance is measured in meters and is calculated along the location reference path. The last LRP will have the distance value 0.

Abbreviation: DNP Type: integer

Figure 15:
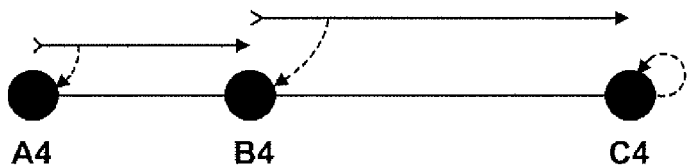

FIG. 15 shows an example of the distance calculation and assignment. The three LRPs are in a sequence from A4 over B4 to C4. Therefore the distance between A4 and B4 along the location reference path will be assigned to A4. The LRP B4 will hold the distance between B4 and C4 and the LRP C4 will have a distance value of 0.

1.1.3.6 Lowest FRC to Next LRP

The lowest FRC (LFRCNP) is the lowest FRC value which appears in the location reference path between two consecutive LRPs. The highest FRC value is 0 and the lowest possible FRC value is valued with 7.

Abbreviation: LFRCNP Type: integer 1.1.4. Offsets

Offsets are used to shorten the location reference path at its start and end. The new positions along the location reference path indicate the real start and end of the location.

1.1.4.1 Positive Offset

Figure 16:
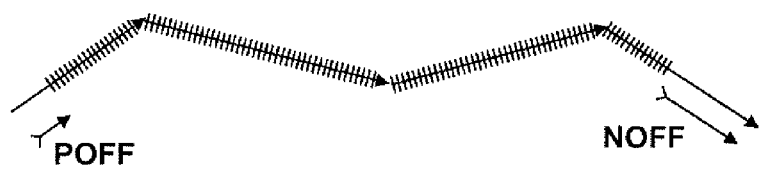
FIG. 16 illustrates the use of offsets.

The positive offset (POFF) is the difference of the start point of the location reference and the start point of the desired location along the location reference path. The value is measured in meters. FIG. 16 shows an example for the calculation of the positive and negative offset. The lines are indicating the location reference path and the hatching indicates the desired location.

Abbreviation: POFF Type: integer 1.1.4.2 Negative Offset

The negative offset (NOFF) is the difference of the end point of the desired location and the end point of the location reference along the location reference path. The value is measured in meters. (see FIG. 16 also).

Abbreviation: NOFF Type: integer 1.2 Relationship Attributes—LRP

All attributes are linked to a LRP. For all LRPs (except that last LRP) the attributes describe an outgoing line of the node at the LRP coordinate. The attributes of the last LRP direct to an incoming of the node at the LRP coordinate.

Figure 17:
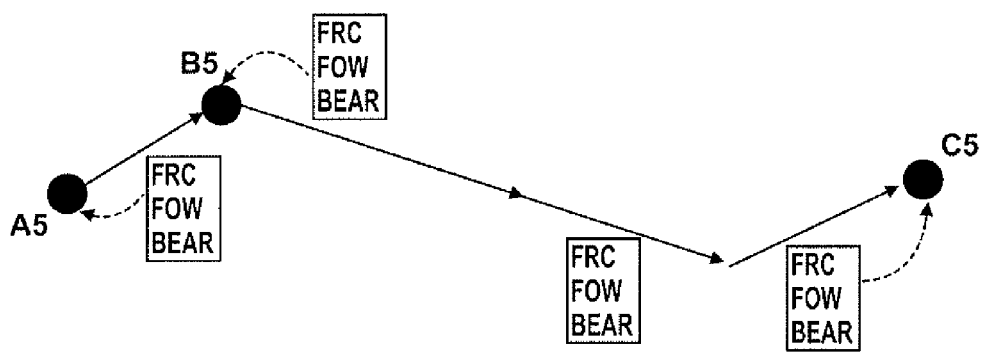
FIG. 17 shows the manner in which LRPs are provided with attributes, FIGS. 18/19 illustrates nodes to be avoided during the encoding of a location reference.

FIG. 17 shows an example for the relationship between a LRP and the attributes. The lines indicate the location reference path and the nodes A5, B5 and C5 are the LRPs. Note that there is also a line whose start and end node is not a LRP (the third line in the sequence). This line does not need to be referenced because it is covered by the shortest path between the LRPs B5 and C5.

The LRPs A5 and B5 direct to an outgoing line and the last LRP C5 directs to an incoming line.

1.3 Data Format Rules

These rules describe additional regulations for location references according to this specification. These rules are used to simplify the encoding and decoding process and to increase the accuracy of the results.

Rule—1 The maximum distance between two location reference points shall not exceed 15 km. The distance is measured along the location reference path. If this condition is not fulfilled for a location reference then a sufficient number of additional LRPs shall be inserted.

The maximum distance between two consecutive location reference points is restricted in order to speed up shortest-path computation because several short routes can be computed quicker than one large route if the routing algorithm has to take the whole network into account. The restriction also provides the opportunity to from a compact binary format with an acceptable accuracy.

Rule—2 All lengths are integer values. If there are float values available then we will round these values to get an integer representation.

Different maps might store the length values in different formats and also with different precision and the uniform basis for all is the usage of integer values. It is also more compact to transmit integer values in a binary format than using float values.

Rule—3 Two LRPs are mandatory and the number of intermediate LRPs is not limited.

A line location reference must always have at least two location reference points indicating the start and the end of the location. If the encoder detects critical situations where the decoder (on a different map) might get into trouble, the location reference might be enhanced with additional intermediate LRPs.

Rule—4 The coordinates of the LRPs shall be chosen on real network nodes.

These real network nodes shall be junctions in the real world and it is expected that these junctions can be found in different maps with a higher probability than positions somewhere on a line. Additionally nodes shall be avoided which can be easily skipped during a route search. At these avoidable nodes it is not possible to deviate from a route.

Figure 18:
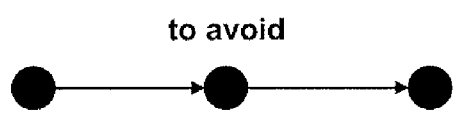
Figure 19:
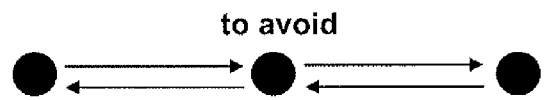

Nodes having only one incoming and one outgoing line shall be avoided since these nodes are not related to junctions (see FIG. 18) and can be stepped over during route search. Nodes which have two incoming and two outgoing lines and there are only two adjacent nodes shall also be avoided (see FIG. 19).

If one of these nodes is selected for a LRP then this LRP should be shifted along the location reference path in order to find a suitable node. This can be done since a route calculation will step over such avoidable nodes without leaving the desired path.

If the start or the end of a location is placed on avoidable nodes then the encoder should expand the location uniquely and should find a suitable node outside of the location. This expansion must never go into the location because this will shorten the location.

1.3.1. Overview of the Data Format Rules

The following Table summarizes the data format rules.

TABLE A5

Data format rules overview

| Rule | Description | Value |
|---|---|---|
| Rule 1 | max distance between two consecutive LRPs | 15000 m |
| Rule 2 | road length values | treated as integer values |
| Rule 3 | number of LRPs | at least two LRPs |
| Rule 4 | avoidable nodes | LRPs shall be placed on real network nodes (also valid for start and end of a location) |

1.4 Binary Representation

The physical data format describes a byte-oriented stream format for the logical data format specified above. It uses the components described in the logical data format in section 1.1.

1.4.1. Data Types

The physical data format uses the following data types. Table gives an overview of all available data types and specifies the name, the type and the designated size of each data type. In the following sections the data type names are used to indicate the size and type for each data component.

TABLE A6

Physical format: Data types

| Data type name | Type | Size | Range |
|---|---|---|---|
| Boolean | flag with true = 1 false = 0 | 1 bit | 0-1 |

TABLE A6-continued

Physical format: Data types

| Data type name | Type | Size | Range |
|---|---|---|---|
| uByte | unsigned integer | 1 byte | 0-255 |
| uShort | unsigned integer | 2 bytes | 0-65535 |
| uSmallInt | unsigned integer | 3 bytes | 0-16777215 |
| uInteger | unsigned integer | 4 bytes | 0-4294967295 |
| sByte | signed integer | 1 byte | −128-27 |
| sShort | signed integer | 2 bytes | −32768-32767 |
| sSmallInt | signed integer | 3 bytes | −8388608-8388607 |
| sInteger | signed integer | 4 bytes | −2147483648-2147483647 |
| String[n] | array of n characters | n bytes | variable size |
| BitField[n] | array of n bits | n bits | variable size |

Negative integer values are stored in the two's complement format.

1.4.2. Coordinates (COORD)

Each point in a map consists of a coordinate pair "longitude" (lon) and "latitude" (lat) represented in WGS84 coordinates. The directions north and east are represented by positive values (longitude and latitude respectively). The lon and lat values are stored in a decamicrodegrees resolution ($10^{-5}$, five decimals).

The coordinate values will be transmitted as integer values. These values will be generated using Equation E1 which calculates a 24-bit integer representation. The resolution parameter is set to 24. This translation leads to an error of about 2.4 meter at most. The backward translation is described in Equation E2. Both equations make use of the signum function which is −1 for negative values, 1 for positive values and 0 otherwise.

Transformation from decimal coordinates into integer values — Equation E1

$$int = \left( sgn(deg) * 0.5 + \frac{deg * 2^{Resolution}}{360°} \right)$$

Transformation from integer values into decimal coordinates — Equation E2

$$deg = \left( \frac{(int - sgn(int) * 0.5) * 360°}{2^{Resolution}} \right)$$

The physical format makes use of an absolute and a relative coordinate format. The absolute format represents the designated values of the geographical position and the relative value is the offset the coordinates relative to the preceding coordinate.

1.4.2.1 Absolute Format

The absolute format describes geographical position in a 24-bit resolution. Table A7 shows the data type used for the absolute format.

TABLE A7

Physical format: Coordinate format (absolute)

| Data type | Value | Description |
|---|---|---|
| sSmallInt | −8388608-+8388607 | 24 bit representation |

1.4.2.2 Relative Format

The relative format is used to describe differences between two consecutive coordinates. The difference is calculated for each value (lon/lat) separately as shown in Equation E3. The current and previous values represent the latitude (longitude)

value in degrees. The difference between these two values is multiplied with 100000 in order to resolve an integer value.

relative=round(100000*(currentPo int−previousPo int))    Equation E3: Relative Coordinates Calculation Table A8 shows the maximum distances which are possible using a 16-bit representation. The figures are calculated for a fixed coordinate at lon=5° and lat=52° (location in the Netherlands).

TABLE A8

Physical format: Longitude/Latitude ranges for relative coordinates

| byte | latitude | | longitude | |
| --- | --- | --- | --- | --- |
| | lower bound | upper bound | lower bound | upper bound |
| 2 | −36459 m | 36460 m | −22504 m | 22504 m |

Table A9 shows the data type for 2 bytes offsets.

TABLE A9

Physical format: Coordinate format (relative)

| Data type | Value | Description |
| --- | --- | --- |
| sShort | −32768−+32767 | 2 bytes relative coordinates |

1.4.3. Attribute Values

The binary format of the attributes will follow in this section.

1.4.3.1 Functional Road Class (FRC)

The functional road class (FRC) can hold eight different values as described in the logical format. These eight values are represented by 3 bits and the mapping is shown in Table A10.

TABLE A10

Physical format: Functional road class

| Data type | Value (integer) | Value (binary) | Description |
| --- | --- | --- | --- |
| BitField[3] | 0 | 000 | FRC 0—Main road |
| | 1 | 001 | FRC 1—First class road |
| | 2 | 010 | FRC 2—Second class road |
| | 3 | 011 | FRC 3—Third class road |
| | 4 | 100 | FRC 4—Fourth class road |
| | 5 | 101 | FRC 5—Fifth class road |
| | 6 | 110 | FRC 6—Sixth class road |
| | 7 | 111 | FRC 7—Other class road |

1.4.3.2 Form of Way (FOW)

The form of way (FOW) can hold eight different values as described in the logical format. These eight values are represented by 3 bits and the mapping is shown in TableA11.

TABLE A11

All Physical format: Form of way

| Data type | Value (integer) | Value (binary) | Description |
| --- | --- | --- | --- |
| BitField[3] | 0 | 000 | UNDEFINED |
| | 1 | 001 | MOTORWAY |
| | 2 | 010 | MULTIPLE_CARRIAGEWAY |
| | 3 | 011 | SINGLE_CARRIAGEWAY |

TABLE A11-continued

All Physical format: Form of way

| Data type | Value (integer) | Value (binary) | Description |
| --- | --- | --- | --- |
| | 4 | 100 | ROUNDABOUT |
| | 5 | 101 | TRAFFICSQUARE |
| | 6 | 110 | SLIPROAD |
| | 7 | 111 | OTHER |

1.4.3.3 Bearing (BEAR)

The bearing describes the angle between the road and the true North as described in the logical format. The physical data format defines 32 sectors whereby each sector covers 11.25° of the circle. These 32 sectors are represented by 5 bits. Table A12 shows the data type for the bearing attribute and Table A13 shows the mapping from the sectors to the concrete value.

TABLE A12

Physical format: Bearing

| Data type | Value | Description |
| --- | --- | --- |
| BitField[5] | 0-31 | number of the sector in which the angle between the North and the line specified in the logical data format is located; the full circle is divided into 32 sectors each covering an angle of 11.25°. |

TABLE A13

Physical format: Bearing value definition

| Value | Sector |
| --- | --- |
| 0 | 000.00° <= x < 011.25° |
| 1 | 011.25° <= x < 022.50° |
| 2 | 022.50° <= x < 033.75° |
| 3 | 033.75° <= x < 045.00° |
| 4 | 045.00° <= x < 056.25° |
| 5 | 056.25° <= x < 067.50° |
| 6 | 067.50° <= x < 078.75° |
| 7 | 078.75° <= x < 090.00° |
| 8 | 090.00° <= x < 101.25° |
| 9 | 101.25° <= x < 112.50° |
| 10 | 112.50° <= x < 123.75° |
| 11 | 123.75° <= x < 135.00° |
| 12 | 135.00° <= x < 146.25° |
| 13 | 146.25° <= x < 157.50° |
| 14 | 157.50° <= x < 168.75° |
| 15 | 168.75° <= x < 180.00° |
| 16 | 180.00° <= x < 191.25° |
| 17 | 191.25° <= x < 202.50° |
| 18 | 202.50° <= x < 213.75° |
| 19 | 213.75° <= x < 225.00° |
| 20 | 225.00° <= x < 236.25° |
| 21 | 236.25° <= x < 247.50° |
| 22 | 247.50° <= x < 258.75° |
| 23 | 258.75° <= x < 270.00° |
| 24 | 270.00° <= x < 281.25° |
| 25 | 281.25° <= x < 292.50° |
| 26 | 292.50° <= x < 303.75° |
| 27 | 303.75° <= x < 315.00° |
| 28 | 315.00° <= x < 326.25° |

TABLE A13-continued

Physical format: Bearing value definition

| Value | Sector |
|---|---|
| 29 | 326.25° <= x < 337.50° |
| 30 | 337.50° <= x < 348.75° |
| 31 | 348.75° <= x < 360.00° |

Figure 20:
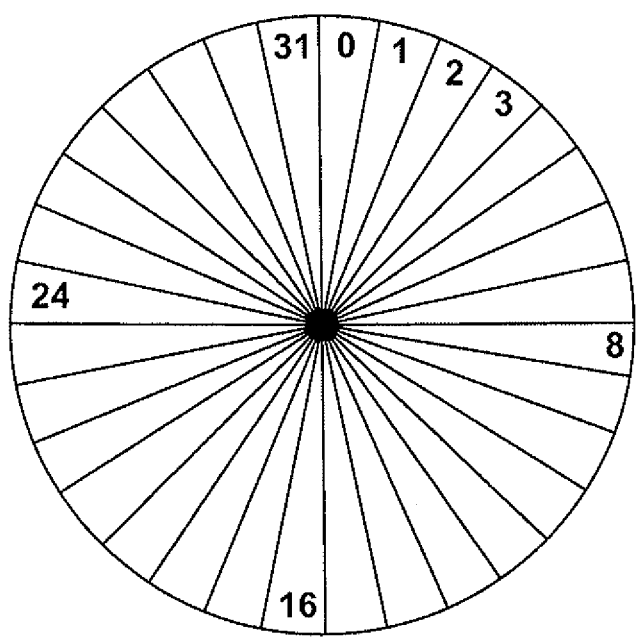
FIG. 20 illustrates how bearing values for a LRP fall within 1 of 32 discrete sectors of a circle.

Equation E4 outlines the calculation of the bearing value and FIG. 20 provides a graphical overview of the sectors.

Calculation of the bearing value — Equation E4

$$\text{value} = \left\lfloor \frac{\text{angle}}{11.25°} \right\rfloor, 0° \le \text{angle} < 360°$$

1.4.3.4 Distance to Next LRP (DNP)

The DNP attribute measures the distance between two consecutive LRPs along the location reference path as described in the logical format.

The physical data format defines an 8-bit representation and Table A14 shows the data type used for DNP. This representation defines 255 intervals and in combination with rule 1 of the data format rules (maximum length between two consecutive LRPs is limited by 15000 m) each interval will have a length of 58.6 meters.

TABLE A14

Physical format: Distance to next point

| Data type | Value | Description |
|---|---|---|
| BitField[5] | 0-255 | distance interval according to Equation E5 |

Equation E5 shows how the DNP values can be calculated.

Calculation of the DNP value — Equation E5

$$\text{value} = \left\lfloor \frac{\text{length}}{58.6 \text{ m}} \right\rfloor$$

1.4.3.5 Lowest FRC to Next Point (LFRCNP)

The lowest FRC to the next point indicates the lowest functional road class used in the location reference path to the next LRP. This information could be used to limit the number of road classes which need to be scanned during the decoding. See Table A15 for a definition of the data type.

TABLE A15

Physical format: Lowest FRC to next point

| Data type | Value | Description |
|---|---|---|
| BitField[3] | 0-7 | holds the same values as described in Table |

1.4.4. Location Reference Header

The Location Reference header contains general information about the reference.

1.4.4.1 Version (VER)

The version is used to distinguish between several physical and data formats for location references. The version number is represented by 3 bits and the data type is shown in Table A16.

TABLE A16

Physical format: Version

| Data type | Value | Description |
|---|---|---|
| BitField[3] | 0-7 | current version number |

1.4.4.2 Attribute Flag (AF)

The attribute flag indicates whether there are attributes appended to each LRP or not. The AF value is 0 if no attributes are appended and therefore the location reference only consists of coordinates. Otherwise a value of 1 indicates that attributes are appended to each LRP. The data type for the AF is shown in Tables A17 and A18.

TABLE A17

Physical format: Attribute flag

| Data type | Value | Description |
|---|---|---|
| Boolean | 0, 1 | flag, indicating whether attributes are appended to each LRP or not |

TABLE A18

Physical format: Attribute flag values

| Value | Description |
|---|---|
| 0 | no attributes are appended |
| 1 | for each LRP a set of attributes is appended |

1.4.4.3 Area Flag (ArF)

The area flag indicates whether the location reference describes an area or not. If this flag is set then the location shall be connected and we describe an area, as seen in Tables A19 and A20 below.

TABLE A19

Physical format: Area flag

| Data type | Value | Description |
|---|---|---|
| Boolean | 0, 1 | flag, indicating whether the location reference describes an area or not |

TABLE A20

Physical format: Area flag values

| Value | Description |
|---|---|
| 0 | location reference describes no area |
| 1 | location reference describes an area |

1.4.5. Offsets

Offsets are used to locate the start and end of a location more precise than bound to the nodes in a network. The logical format defines two offsets, one at the start of the location and one at the end of the location and both offsets operate along the lines of the location and are measured in meters. The offset values are not mandatory and a missing offset value means an offset of 0 meters. Offsets are also only valid for line locations which have attributes included.

1.4.5.1 Offset Flags

Offset flags indicate whether the data includes a specific offset information or not. The physical data format deals with two flags corresponding to the two different offset values. The positive offset flag (PoffF) and the negative offset flag (NoffF) are described in Tables A21 and A22.

TABLE A21

| Physical format: Offset flag | | |
|---|---|---|
| Data type | Value | Description |
| Boolean | 0, 1 | flag, indicating whether the corresponding offset value is included in the data or not |

TABLE A22

| Physical format: Offset flag values | |
|---|---|
| Value | Description |
| 0 | location reference data does NOT include the corresponding offset information |
| 1 | location reference data includes the corresponding offset information |

1.4.5.2 Offset Values

The offset values (positive and negative, POFF and NOFF) indicate the distance between the start (end) of the location reference path and the "real" start (end) of the location.

The physical data format defines an 8-bit representation for each offset value. Table A23 shows the data type used for POFF and NOFF. This representation allows us to define 256 intervals with a length of each interval of 58.6 meters. The interval number calculation for offsets is outlined in Equation E6.

TABLE A23

| Physical format: Offset | | |
|---|---|---|
| Data type | Value | Description |
| BitField[5] | 0-255 | offset length interval according to Equation E6 |

Calculation of offset values — Equation E6

$$value = \left\lfloor \frac{offset\ length}{58.6\ m} \right\rfloor$$

1.5 Physical Data Format Specification

This section describes the arrangement of the data fields in a byte stream. It is assumed that we have a byte-oriented stream and we can use 8 bits per byte.

1.5.1. Overview

The main structure of the binary format is:

Header, First LRP, following LRPs, Last LRP, and offsets

The Header, the first LRP and the last LRP are mandatory and the number of following LRPs is not limited. The Last LRP has its own structure due to a different information level. Offsets are optional and the existence will be indicated by flags in the attributes of the last LRP.

Table A24 gives an overview of the main structure. The stream can be read from the left to the right, so that the first received byte will be the status byte. For each coordinate the first received value will be the longitude value followed by the latitude value.

The calculation of message sizes depending on the number of LRPs can be found in section 1.6 below.

TABLE A24

| | Binary format overview | | | | | | | | | | | |
|---|---|---|---|---|---|---|---|---|---|---|---|---|
| | Structure | | | | | | | | | | | |
| | Header | First LRP | | | | | following LRP | | | | | ... |
| | | Name | | | | | | | | | | |
| | Status | absolute Longitude | absolute Latitude | attr. 1 | attr. 2 | attr. 3 | relative Longitude | relative Latitude | attr. 1 | attr. 2 | attr. 3 | ... |
| # bytes | 1 | 3 | 3 | 1 | 1 | 1 | 2 | 2 | 1 | 1 | 1 | ... |
| description | section 1.5.2 | section 1.5.3 | section 1.5.3 | section 1.5.5.1 | section 1.5.5.2 | section 1.5.5.3 | section 1.5.4 | section 1.5.4 | section 1.5.5.1 | section 1.5.5.2 | section 1.5.5.3 | ... |

| | Structure | | | | | |
|---|---|---|---|---|---|---|
| | ... | last LRP | | | | positive offset | negative offset |
| | | Name | | | | | |
| | ... | relative Longitude | relative Latitude | attr. 1 | attr. 4 | offset | offset |
| # bytes | ... | 2 | 2 | 1 | 1 | 1 | 1 |
| description | ... | section 1.5.3 | section 1.5.3 | section 1.5.5.1 | section 1.5.5.4 | section 1.5.6 | section 1.5.6 |

1.5.2. Status Byte

The status byte is transmitted once for every location reference and contains the area flag (ArF, section 1.4.4.3), attribute flag (AF, section 1.4.4.2) and the version information (VER, section 1.4.4.1). The bits 7, 6 and 5 are reserved for future use (RFU) and shall be 0. Table A25 gives an overview of the usage of each bit in the status byte.

TABLE A25

| | | | | | | | | |
|---|---|---|---|---|---|---|---|---|
| | Status byte | | | | | | | |
| Bit | 7 | 6 | 5 | 4 | 3 | 2 | 1 | 0 |
| used for | RFU | RFU | RFU | Arf | AF | VER | | |

In this particular version of the format, attributes are added to each LRP and areas are not described. If the "current version" is 2, the status byte will have the value shown in Table A26:

TABLE A26

| | | | | | | | | |
|---|---|---|---|---|---|---|---|---|
| | Status byte value | | | | | | | |
| Bit | 7 | 6 | 5 | 4 | 3 | 2 | 1 | 0 |
| value | 0 | 0 | 0 | 0 | 1 | 010 | | |

1.5.3. First LRP Coordinates

The coordinates of the first LRP are transmitted in an absolute format (see section 1.4.2.1) and therefore each value (lon and lat) will use 3 bytes. Table A27 shows the byte order for longitude and latitude values.

TABLE A27

| | | | | | | | | | | | | | | | | | | | | | | | | |
|---|---|---|---|---|---|---|---|---|---|---|---|---|---|---|---|---|---|---|---|---|---|---|---|---|
| | First LRP coordinates | | | | | | | | | | | | | | | | | | | | | | | |
| Bit | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| used for | highest byte | | | | | | | | middle byte | | | | | | | | lowest byte | | | | | | | |

1.5.4. Following LRP Coordinates

The coordinates of the following LRPs and the last LRP are transmitted in a relative format (see section 1.4.2.2) and therefore each value (lon and lat) will use 2 bytes. Table A28 shows the byte order for longitude and latitude values.

TABLE A28

| | | | | | | | | | | | | | | | | |
|---|---|---|---|---|---|---|---|---|---|---|---|---|---|---|---|---|
| | Following LRPs coordinates | | | | | | | | | | | | | | | |
| Bit | 15 | 14 | 13 | 12 | 11 | 10 | 9 | 8 | 7 | 6 | 5 | 4 | 3 | 2 | 1 | 0 |
| used for | highest byte | | | | | | | | lowest byte | | | | | | | |

1.5.5. Attributes

Attributes are added to each LRP. There are 4 different types of attributes depending on the position of a LRP in the location reference.

1.5.5.1 First Attribute Byte (Attr. 1)

The first attribute byte contains the attributes FRC (see section 1.4.3.1) and FOW (see section 1.4.3.2) and two bits are reserved for future use. Table A29 shows the usage of each bit.

TABLE A29

| | | | | | | | | |
|---|---|---|---|---|---|---|---|---|
| | First attribute byte - valid for all LRPs | | | | | | | |
| Bit | 7 | 6 | 5 | 4 | 3 | 2 | 1 | 0 |
| used for | RFU | RFU | FRC | | | FOW | | |

1.5.5.2 Second Attribute Byte (Attr. 2)

The second attribute byte contains the attributes LFRCNP (see section 1.4.3.5) and BEAR (see section 1.4.3.3). Table A30 shows the usage of each bit. This attribute is not valid for the last LRP since there is no LFRCNP information available.

TABLE A30

| | | | | | | | | |
|---|---|---|---|---|---|---|---|---|
| | Second attribute byte - valid for all LRPs, except the last LRP | | | | | | | |
| Bit | 7 | 6 | 5 | 4 | 3 | 2 | 1 | 0 |
| used for | LFRCNP | | | BEAR | | | | |

1.5.5.3 Third Attributes Byte (Attr. 3)

The third attribute byte contains the attribute DNP (see section 14.3.4) as shown in Table A31. This attribute is not valid for the last LRP since there is no DNP information available.

TABLE A31

| | | | | | | | | |
|---|---|---|---|---|---|---|---|---|
| | Third attribute byte - valid for all LRPs, except the last LRP | | | | | | | |
| Bit | 7 | 6 | 5 | 4 | 3 | 2 | 1 | 0 |
| used for | DNP | | | | | | | |

1.5.5.4 Fourth Attribute Byte (Attr. 4)

The attribute 4 contains the BEAR information, the positive and negative offset flags (see section 1.4.5.1) and one bit is reserved for future use. This attribute is used for the last LRP, as shown in Table A32.

TABLE A32

| Fourth attribute bytes - valid only for the last LRP | | | | | | | | |
|---|---|---|---|---|---|---|---|---|
| Bit | 7 | 6 | 5 | 4 | 3 | 2 | 1 | 0 |
| used for | RFU | POffF | NOffF | BEAR | | | | |

1.5.6. Offset

The positive offset (POFF) and negative offset (NOFF) are only included if the corresponding flags in attribute 4 indicate their existence. Absent offset values indicate an offset of 0 meters. The offset values are calculated according to section 1.4.5., and bit usage for these offsets is shown in Tables A33, A34.

TABLE A33

| Positive offset value | | | | | | | | |
|---|---|---|---|---|---|---|---|---|
| Bit | 7 | 6 | 5 | 4 | 3 | 2 | 1 | 0 |
| used for | POFF | | | | | | | |

TABLE A34

| Negative offset value | | | | | | | | |
|---|---|---|---|---|---|---|---|---|
| Bit | 7 | 6 | 5 | 4 | 3 | 2 | 1 | 0 |
| used for | NOFF | | | | | | | |

1.6 Message Size Calculation

The message size of a location reference depends on the number of LRPs included in the location reference. There must be at least two LRPs in the location reference. Also mandatory is the header with the status information. The following calculation and Table A35 show message sizes depending on the number of LRPs.

Header
  1 byte status
  Total: 1 byte
First LRP
  6 bytes COORD (3 bytes each for lon/lat)
  3 bytes Attributes
  Total: 9 bytes
Following LRPs
  4 bytes COORD (2 bytes each for lon/lat)
  3 bytes Attributes
  Total: 7 bytes
Last LRP
  4 bytes COORD (2 bytes each for lon/lat)
  2 bytes Attributes
  Total: 6 bytes
Offset (if included)
  1 byte positive offset (if included)
  1 byte negative offset (if included)
  Total: 0-2 bytes

TABLE A35

| Message sizes depending on the number of LRPs | |
|---|---|
| # LRPs | Message Size |
| 2 | 16 bytes |
|  | (+1 or +2 bytes offset, if included) |
| 3 | 23 bytes |
|  | (+1 or +2 bytes offset, if included) |
| 4 | 30 bytes |
|  | (+1 or +2 bytes offset, if included) |
| 5 | 37 bytes |
|  | (+1 or +2 bytes offset, if included) |
| 6 | 44 bytes |
|  | (+1 or +2 bytes offset, if included) |
| 7 | 51 bytes |
|  | (+1 or +2 bytes offset, if included) |
| 8 | 58 bytes |
|  | (+1 or +2 bytes offset, if included) |
| . . . | . . . |
| n(n > 1) | $1 + 9 + (n - 2)*7 + 6$ bytes |
|  | (+1 or +2 bytes offset, if included) |

A specific example of the manner in which the above formats are used is now provided with reference to the location reference described above with reference to FIGS. 2, 3, 4 and 5 in which three location reference points (nodes ①, ⑩ and ⑮ and lines ①-③, ⑩-⑪ and ⑭-⑮) are identified as precisely describing a location.

The location reference consists of three location reference points and Table A36 below shows the coordinates for the nodes ①, ⑩ and ⑮. These nodes are the corresponding nodes to the location reference points. In preparation of the binary format this table also shows the relative coordinates. The node ① corresponds to the location reference point 1 and will have coordinates in absolute format. Node ⑩ corresponding to location reference point 2 will have relative coordinates to the location reference point 1. Node ⑮ corresponding to location reference point 2 will also have relative coordinates but now referencing to location reference point 2.

TABLE A36

| Example coordinates | | | | | |
|---|---|---|---|---|---|
| Node ID | LRP index | Longitude | Latitude | Relative longitude | Relative latitude |
| ① | 1 | 6.12683° | 49.60851° | — | — |
| ⑩ | 2 | 6.12838° | 49.60398° | 155 | −453 |
| ⑮ | 3 | 6.12817° | 49.60305° | −21 | −93 |

The relative longitude and latitude are calculated according Equation E3 above. The offsets being calculated in step 2 of the encoding process are shown in Table A37. In the binary data only the positive offset will appear because the negative offset is 0 and a missing offset will be treated as 0.

TABLE A37

Example offset values

| Field | Value |
|---|---|
| positive Offset | 150 |
| negative Offset | 0 |

Table A38 below collects the relevant data for each location reference point from the underlying digital map, and through calculation. This includes the functional road class, the form of way and the bearing of the corresponding line. The needed information about the path between two subsequent location reference points is also shown (lowest functional road class and distance to the next location reference point).

TABLE A38

Location reference points determined during encoding

| LRP index | FRC | FOW | BEAR | LFRCNP | DNP |
|---|---|---|---|---|---|
| 1 | FRC3 | MULTIPLE_CARRIAGEWAY | 135° | FRC3 | 561 |
| 2 | FRC3 | SINGLE_CARRIAGEWAY | 227° | FRC5 | 274 |
| 3 | FRC5 | SINGLE_CARRIAGEWAY | 290° | — | — |

The BEAR, LFRCNP and DNP attributes are determined as described above:

The following tables above hold all relevant information for creating the binary data. The following tables outline the binary data according to the Physical Data Format:
Status byte: see Table A39
LRP 1: see Table A40 to Table A44
LRP 2 see Table A45 to Table A49
LRP 3 see Table A50 to Table A53
Offset see Table A54

TABLE A39

Binary example: status byte

| Bit | 7 | 6 | 5 | 4 | 3 | 2 | 1 | 0 |
|---|---|---|---|---|---|---|---|---|
| Description | RFU | RFU | RFU | ArF | AF | Version | | |
| Value | 0 | 0 | 0 | 0 | 1 | 0 | 1 | 0 |

TABLE A40

Binary example: LRP 1 - absolute longitude

| Byte | First | | | | | | | | Second | | | | | | | | Third | | | | | | | |
|---|---|---|---|---|---|---|---|---|---|---|---|---|---|---|---|---|---|---|---|---|---|---|---|---|
| Bit | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Value | 0 | 0 | 0 | 0 | 0 | 1 | 0 | 0 | 0 | 1 | 0 | 1 | 1 | 0 | 1 | 1 | 0 | 1 | 1 | 0 | 1 | 0 | 1 | 1 |

TABLE A41

Binary example: LRP1 - absolute latitude

| Byte | First | | | | | | | | Second | | | | | | | | Third | | | | | | | |
|---|---|---|---|---|---|---|---|---|---|---|---|---|---|---|---|---|---|---|---|---|---|---|---|---|
| Bit | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Value | 0 | 0 | 1 | 0 | 0 | 0 | 1 | 1 | 0 | 1 | 0 | 0 | 0 | 1 | 1 | 0 | 1 | 1 | 1 | 1 | 0 | 1 | 0 | 0 |

TABLE A42

Binary example: LRP1 - attribute 1

| Bit | 7 | 6 | 5 | 4 | 3 | 2 | 1 | 0 |
|---|---|---|---|---|---|---|---|---|
| Description | RFU | RFU | FRC | | | FOW | | |
| Value | 0 | 0 | 0 | 1 | 1 | 0 | 1 | 0 |

TABLE A43

Binary example: LRP1 - attribute 2

| Bit | 7 | 6 | 5 | 4 | 3 | 2 | 1 | 0 |
|---|---|---|---|---|---|---|---|---|
| Description | LFRCNP | | | Bearing | | | | |
| Value | 0 | 1 | 1 | 0 | 1 | 1 | 0 | 0 |

TABLE A44

Binary example: LRP1 - attribute 3

| Bit | 7 | 6 | 5 | 4 | 3 | 2 | 1 | 0 |
|---|---|---|---|---|---|---|---|---|
| Description | | | | | DNP | | | |
| Value | 0 | 0 | 0 | 0 | 1 | 0 | 0 | 1 |

TABLE A45

Binary example: LRP2 - relative longitude

| Byte | First | | | | | | | | Second | | | | | | | |
|---|---|---|---|---|---|---|---|---|---|---|---|---|---|---|---|---|
| Bit | 7 | 6 | 5 | 4 | 3 | 2 | 1 | 0 | 7 | 6 | 5 | 4 | 3 | 2 | 1 | 0 |
| Value | 0 | 0 | 0 | 0 | 0 | 0 | 0 | 0 | 1 | 0 | 0 | 1 | 1 | 0 | 1 | 1 |

TABLE A46

Binary example: LRP2 - relative latitude

| Byte | First | | | | | | | | Second | | | | | | | |
|---|---|---|---|---|---|---|---|---|---|---|---|---|---|---|---|---|
| Bit | 7 | 6 | 5 | 4 | 3 | 2 | 1 | 0 | 7 | 6 | 5 | 4 | 3 | 2 | 1 | 0 |
| Value | 1 | 1 | 1 | 1 | 1 | 1 | 1 | 0 | 0 | 0 | 1 | 1 | 1 | 0 | 1 | 1 |

TABLE A47

Binary example: LRP2 - attribute 1

| Bit | 7 | 6 | 5 | 4 | 3 | 2 | 1 | 0 |
|---|---|---|---|---|---|---|---|---|
| Description | RFU | RFU | FRC | | | FOW | | |
| Value | 0 | 0 | 0 | 1 | 1 | 0 | 1 | 1 |

TABLE A48

Binary example: LRP2 - attribute 2

| Bit | 7 | 6 | 5 | 4 | 3 | 2 | 1 | 0 |
|---|---|---|---|---|---|---|---|---|
| Description | LFRCNP | | | | Bearing | | | |
| Value | 1 | 0 | 1 | 1 | 0 | 1 | 0 | 0 |

TABLE A49

Binary example: LRP2 - attribute 3

| Bit | 7 | 6 | 5 | 4 | 3 | 2 | 1 | 0 |
|---|---|---|---|---|---|---|---|---|
| Description | | | | | DNP | | | |
| Value | 0 | 0 | 0 | 0 | 0 | 1 | 0 | 0 |

TABLE A50

Binary example: LRP3 - relative longitude

| Byte | First | | | | | | | | Second | | | | | | | |
|---|---|---|---|---|---|---|---|---|---|---|---|---|---|---|---|---|
| Bit | 7 | 6 | 5 | 4 | 3 | 2 | 1 | 0 | 7 | 6 | 5 | 4 | 3 | 2 | 1 | 0 |
| Value | 1 | 1 | 1 | 1 | 1 | 1 | 1 | 1 | 1 | 1 | 0 | 1 | 0 | 1 | 1 |

TABLE A51

Binary example: LRP3 - relative latitude

| Byte | First | | | | | | | | Second | | | | | | | |
|---|---|---|---|---|---|---|---|---|---|---|---|---|---|---|---|---|
| Bit | 7 | 6 | 5 | 4 | 3 | 2 | 1 | 0 | 7 | 6 | 5 | 4 | 3 | 2 | 1 | 0 |
| Value | 1 | 1 | 1 | 1 | 1 | 1 | 1 | 1 | 0 | 1 | 0 | 0 | 0 | 1 | 1 |

TABLE A52

Binary example: LRP3 - attribute 1

| Bit | 7 | 6 | 5 | 4 | 3 | 2 | 1 | 0 |
|---|---|---|---|---|---|---|---|---|
| Description | RFU | RFU | FRC | | | FOW | | |
| Value | 0 | 0 | 1 | 0 | 1 | 0 | 1 | 1 |

TABLE A53

Binary example: LRP3 - attribute 4

| Bit | 7 | 6 | 5 | 4 | 3 | 2 | 1 | 0 |
|---|---|---|---|---|---|---|---|---|
| Description | RFU | PoffF | NoffF | Bearing | | | | |
| Value | 0 | 1 | 0 | 1 | 1 | 0 | 0 | 1 |

TABLE A54

Binary example: positive Offset

| Bit | 7 | 6 | 5 | 4 | 3 | 2 | 1 | 0 |
|---|---|---|---|---|---|---|---|---|
| Description | | | | POFF | | | | |
| Value | 0 | 0 | 0 | 0 | 0 | 0 | 1 | 0 |

The full binary data stream will have a length of 24 bytes and consists of the following (ordered as bytes from left to right and top to down):

```
00001010  00000100  01011011  01011011  00100011  01000110
11110100  00011010  01101100  00001001  00000000  10011011
11111110  00111011  00011011  10110100  00000100  11111111
11101011  11111111  10100011  00101011  01011001  00000010
```

The invention claimed is:

1. A method of resolving a location from an ordered list of location reference points, each location reference point being representative of a node in a first digital map and each location reference point being associated with information relating to the properties of a specific line or segment in said first digital map emanating from or incident at the node, the method comprising the steps of:
(i) for each location reference point, identifying at least one candidate node existing in a second digital map, and identifying at least one candidate line or segment existing in said second digital map emanating from or incident at said candidate node;
(ii) performing a route search within said second digital map between: at least one of an identified candidate node and a corresponding identified candidate line or segment emanating therefrom or incident thereat, and at least one of an identified candidate node for the next location reference point appearing in the list and a corresponding identified candidate line or segment emanating therefrom or incident thereat, and extracting from said second digital map each line or segment forming part of the route so determined between said candidate nodes; and
(iii) repeating step (ii) for each consecutive pair of location reference points up to and including the final location reference point appearing in the list,
wherein, when more than one candidate node and/or more than one candidate line or segment in the second digital map is identified for a given location reference point, the method further comprises a step of identifying a most likely candidate node and/or a most likely candidate line or segment, and using the most likely candidate node and/or most likely candidate line or segment in the route search,
wherein elevation information is associated with each location reference point, the elevation information relating to the location reference point and/or the specific line or segment emanating from or incident at the node in the first digital map represented by the location reference point, the elevation information comprising gradient information and a distance of validity for the gradient information along the candidate line or segment, and
using the elevation information in said step of identifying the most likely candidate node and/or most likely candidate line or segment when more than one candidate node and/or candidate line or segment is found in the second digital map to resolve the location in the second digital map.

2. The method of claim 1 wherein the elevation information is one or more of absolute elevation information or relative elevation information.

3. The method of claim 1, wherein the elevation information further comprises ellipsoidal height information.

4. The method of 1, wherein each location reference point is associated with information defining the position of the location reference point, the position information including longitudinal, latitudinal and elevation position information.

5. The method of claim 1 wherein the gradient information includes information regarding the degree of the gradient and the direction of the gradient.

6. The method of claim 1, wherein curvature information is associated with each location reference point, the curvature information relating to the location reference point and/or the specific line or segment emanating from or incident at the node in the first digital map represented by the location reference point.

7. The method of claim 6, wherein each location reference point is associated with curvature and/or gradient information relating to the specific line or segment emanating from or incident at the node in the first digital map represented by the location reference point, wherein the curvature and/or gradient information is used to identify the most likely candidate line or segment for the location reference point when more than one candidate line or segment is identified for a given location reference point.

8. The method of claim 1, wherein each location reference point is associated with elevation information for the location reference point, wherein the elevation information is used to identify the most likely candidate node for the location reference point when more than one candidate node is identified for a given location reference point.

9. The method of claim 1 further comprising rating the identified candidate nodes and/or candidate lines or segments according to a likelihood that the identified candidate nodes and/or candidate lines or segments correspond to the node in the first map represented by the location reference point or the specific line or segment corresponding to the node in the first map.

10. The method of claim 9 wherein the step of rating the candidate nodes is carried out by using factors associated with elevation and the distance between the location reference point and the candidate node in the second map.

11. The method of claim 9 wherein the step of rating the candidate lines or segments is carried out by using factors associated with curvature or gradient.

12. The method of any of claims 9 further comprising ranking the candidate nodes and/or lines or segments according to a likelihood that the candidate nodes and/or lines or segments correspond to the node in the first map or the line or segment corresponding to the node in the first map represented by the location reference point.

13. The method of claim 9 further comprising displaying the second digital map and displaying the resolved location on the second digital map.

14. A non-transitory computer program product comprising computer readable instructions executable to perform a method according to any of claims 1.

15. A navigation apparatus comprising:
- a memory, wherein the memory stores at least one digital map;
- a set of one or more processors, wherein the one or more processors are coupled to the memory storage, wherein the one or more processors are operative to:
  (i) for each location reference point, identify at least one candidate node existing in a second digital map, and identifying at least one candidate line or segment existing in said second digital map emanating from or incident at said candidate node;
  (ii) perform a route search within said second digital map between: at least one of an identified candidate node and a corresponding identified candidate line or segment emanating therefrom or incident thereat, and at least one of an identified candidate node for the next location reference point appearing in the list and a corresponding identified candidate line or segment emanating therefrom or incident thereat, and extracting from said second digital map each line or segment forming part of the route so determined between said candidate nodes; and
  (iii) repeat step (ii) for each consecutive pair of location reference points up to and including the final location reference point appearing in the list,
- wherein, when more than one candidate node and/or more than one candidate line or segment in the second digital map is identified for a given location reference point, the method further comprises a step of identifying a most likely candidate node and/or a most likely candidate line or segment, and using the most likely candidate node and/or most likely candidate line or segment in the route search,
- wherein elevation information is associated with each location reference point, the elevation information relating to the location reference point and/or the specific line or segment emanating from or incident at the node in the first digital map represented by the location reference point, the elevation information comprising gradient information and a distance of validity for the gradient information along the candidate line or segment, and
- using the elevation in said step of identifying the most likely candidate node and/or most likely candidate line or segment when more than one candidate node and/or candidate line or segment is found in the second digital map.

16. The method of claim 6 wherein the curvature information includes information regarding the degree of curvature of the line or segment and the direction of curvature, and optionally a distance of validity for the curvature information along the line or segment.

17. The navigation apparatus of claim 15, wherein the gradient information comprises a gradient value for incoming and outgoing paths associated with each location reference point.

18. The navigation apparatus of claim 17, wherein a spatial lookup or conflation is used to determine the grained value.

19. The navigation apparatus of claim 15, wherein the gradient value is an average gradient value over the validity distance.

* * * * *